(12) United States Patent
Spevak

(10) Patent No.: US 10,401,984 B2
(45) Date of Patent: Sep. 3, 2019

(54) USER INTERFACE MECHANICAL CONTROL APPARATUS WITH OPTICAL AND CAPACITIVE POSITION DETECTION AND OPTICAL POSITION INDICATION

(71) Applicant: Texas Instruments Incorporated, Dallas, TX (US)

(72) Inventor: Peter Spevak, Moosburg a.d. Isar (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 30 days.

(21) Appl. No.: 15/725,707

(22) Filed: Oct. 5, 2017

(65) Prior Publication Data

US 2018/0164902 A1    Jun. 14, 2018

Related U.S. Application Data

(60) Provisional application No. 62/433,904, filed on Dec. 14, 2016.

(51) Int. Cl.
| | |
|---|---|
| *G06F 3/0362* | (2013.01) |
| *G06F 3/044* | (2006.01) |
| *G06F 3/03* | (2006.01) |
| *G06F 3/038* | (2013.01) |

(52) U.S. Cl.
CPC ............ *G06F 3/0362* (2013.01); *G06F 3/038* (2013.01); *G06F 3/0308* (2013.01); *G06F 3/044* (2013.01)

(58) Field of Classification Search
CPC ...... G06F 3/0362; G06F 3/038; G06F 3/0308; G06F 3/044
See application file for complete search history.

(56) References Cited

U.S. PATENT DOCUMENTS

2008/0087085 A1    4/2008   Ueda et al.
2014/0118639 A1    5/2014   Matsushima
(Continued)

FOREIGN PATENT DOCUMENTS

| | | |
|---|---|---|
| RU | 2507563 C1 | 2/2014 |
| WO | WO2010014356 A2 | 2/2010 |
| WO | WO2012047052 A2 | 4/2012 |

*Primary Examiner* — Andrew Sasinowski
(74) *Attorney, Agent, or Firm* — Brian D. Graham; Charles A. Brill; Frank D. Cimino

(57) ABSTRACT

Disclosed examples include optical and capacitive position detection systems and user interface control apparatus to detect relative positions of a stationary first structure and a movable second structure. The optical system includes pairs of optical source and sensor devices spaced along a first direction on the first structure and a reflector extending along the first direction on the second structure to selectively reflect light from one of the optical sources to the corresponding optical sensor of a given pair when the reflector is proximate the given pair. The capacitive sensing system includes capacitor plate structures on the first structure and a conductive structure on the second structure to move along the first direction to selectively modify a capacitance of a given group of two or more of the plate structures. The detection system also includes an interface circuit to provide a position signal representing the relative position of the first and second structures according to signals from the optical sensors and the capacitor plate structures.

22 Claims, 19 Drawing Sheets

(56) References Cited

U.S. PATENT DOCUMENTS

| | | |
|---|---|---|
| 2014/0267039 A1* | 9/2014 | Curtis ................... G06F 3/0338 |
| | | 345/161 |
| 2014/0292356 A1 | 10/2014 | Spevak |
| 2015/0346864 A1 | 12/2015 | Yang et al. |
| 2015/0370388 A1 | 12/2015 | Choi et al. |
| 2016/0006449 A1 | 1/2016 | Spevak |
| 2016/0077630 A1* | 3/2016 | Inai ....................... H04N 5/232 |
| | | 345/174 |
| 2016/0220176 A1* | 8/2016 | Desnerck ............ G06F 19/3481 |
| 2016/0321810 A1* | 11/2016 | Lee ...................... G01D 5/3473 |
| 2016/0364068 A1 | 12/2016 | Cheng et al. |

\* cited by examiner

USER INTERFACE MECHANICAL CONTROL APPARATUS WITH OPTICAL AND CAPACITIVE POSITION DETECTION AND OPTICAL POSITION INDICATION

REFERENCE TO RELATED APPLICATION

Under 35 U.S.C. § 119, this application claims priority to, and the benefit of, U.S. provisional patent application No. 62/433,904, entitled "Optical and Capacitive Support of a Mechanical Rotation and Position Detection", and filed on Dec. 14, 2016, the entirety of which is hereby incorporated by reference.

BACKGROUND

User interfaces (UIs) and human machine interfaces (HMIs) allow a user or operator to control a machine. Capacitive touch interfaces are becoming more popular, including capacitive touch displays that provide user input capabilities as well as display of data, graphics or other information to an operator. In certain applications, however, mechanical user interface control devices or elements are desired, alone or in addition to capacitive touch interfaces. In the past, potentiometers or other rotary or linear variable resistor elements have been used for control knobs or slider control elements in control panels or other HMIs. More recently, mechanical HMI control elements are being replaced by capacitive touch control elements, like touch wheels, sliders and buttons. Capacitive HMI technology offers long life time, low implementation costs, and ease of use as a sealed fluid and gas proof control element, which is beneficial in areas of operation with explosives and chemical processes. Pure capacitive sensing HMIs, however, suffer from certain technology related disadvantages, such as the immediate response at a touch event, without any tactile threshold, to be sensed by the user. Thus in some applications, either for user experience or safety of operation reasons there is a desire for HMI elements with a certain physical threshold for triggering the control function, while maintaining the advantages of capacitive HMIs. Capacitive HMIs also suffer from susceptibility to electromagnetic interference (EMI). Capacitive position sensing for rotary and/or linear control elements of an HMI provides certain advantages, particularly where the user interface circuitry is sealed. For example, certain HMI applications call for fluid and gas proof control elements, including control elements for areas of operation with explosives and chemical processes. However, capacitive sensing systems are susceptible to electromagnetic interference (EMI).

SUMMARY

Disclosed examples include optical and capacitive position detection systems and user interface control apparatus to detect relative positions of a stationary first structure and a movable second structure. The optical system includes pairs of optical source and sensor devices spaced along a first direction on the first structure and a reflector extending along the first direction on the second structure to selectively reflect light from one of the optical sources to the corresponding optical sensor of a given pair when the reflector is proximate the given pair. The capacitive sensing system includes capacitor plate structures on the first structure and a conductive structure on the second structure to move along the first direction to selectively modify a capacitance of a given group of two or more of the plate structures. The detection system also includes an interface circuit to provide a position signal representing the relative position of the first and second structures according to signals from the optical sensors, the capacitor plate structures, or both. The capacitive structures in certain examples are also configured to contemporaneously perform pure tactile capacitive touch control functions in addition to linear and/or rotational position sensing Disclosed examples include a method to detect relative positions of a stationary first user interface structure and a movable second user interface structure, including illuminating optical sources positioned on the first user interface structure, receiving sensor signals from optical sensors positioned on the first user interface structure and detecting the relative positions of the first and second structures based on the sensor signals from the optical sensors in a first mode, as well as illuminating one or more of the optical sources in a pattern that indicates the detected relative positions of the first and second structures in a second mode.

DETAILED DESCRIPTION

Figure 1:
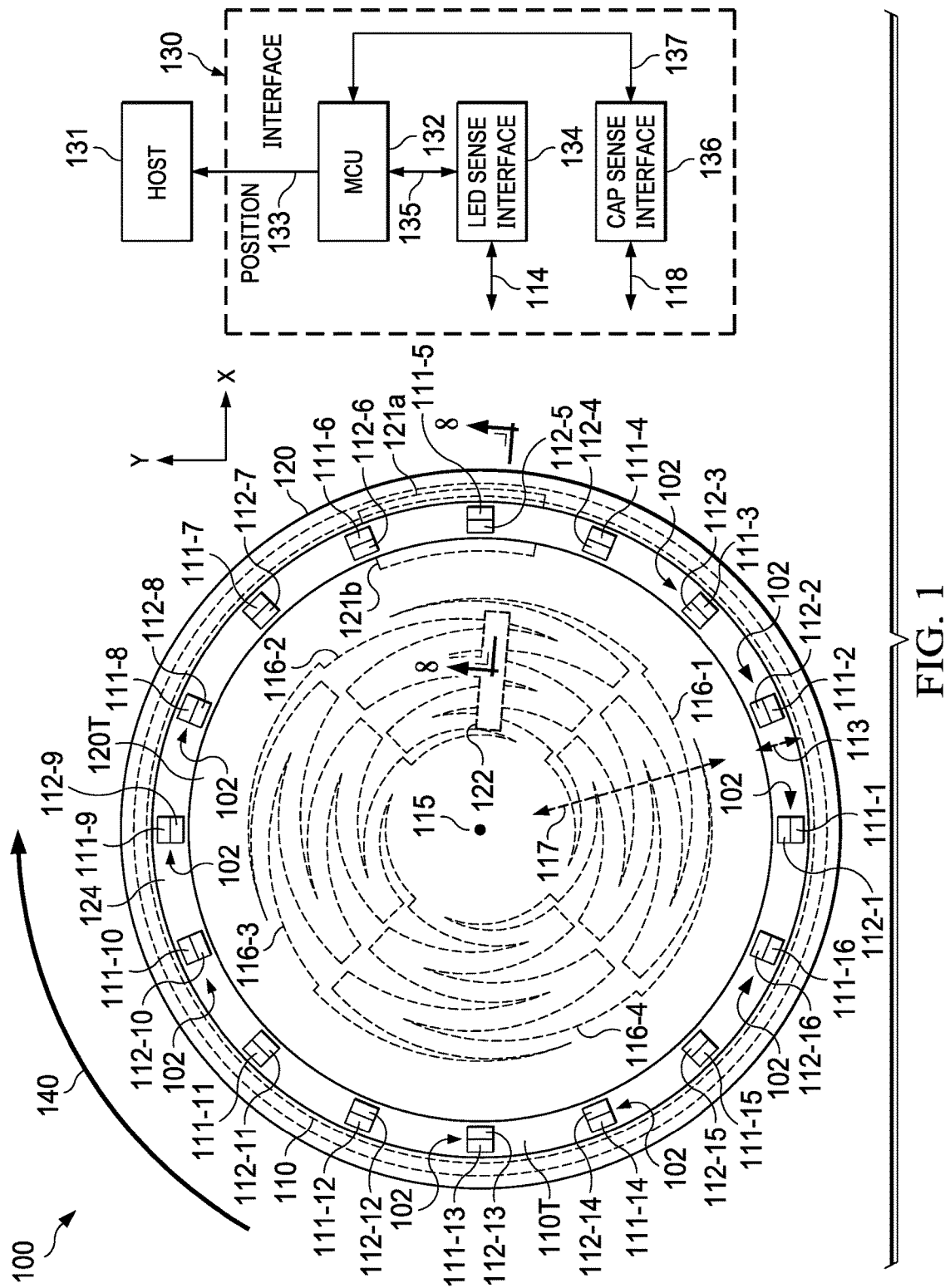
FIG. 1 is a top plan view of a rotational mechanical control element including a stationary first structure and a rotatable second structure for a user interface with capacitive and optical rotational position detection.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the term "couple" or "couples" is intended to include indirect or direct electrical or mechanical connection or combinations thereof. For example, if a first device couples to or is coupled with a second device, that connection may be through a direct electrical connection, or through an indirect electrical connection via one or more intervening devices and connections.

Figure 2:
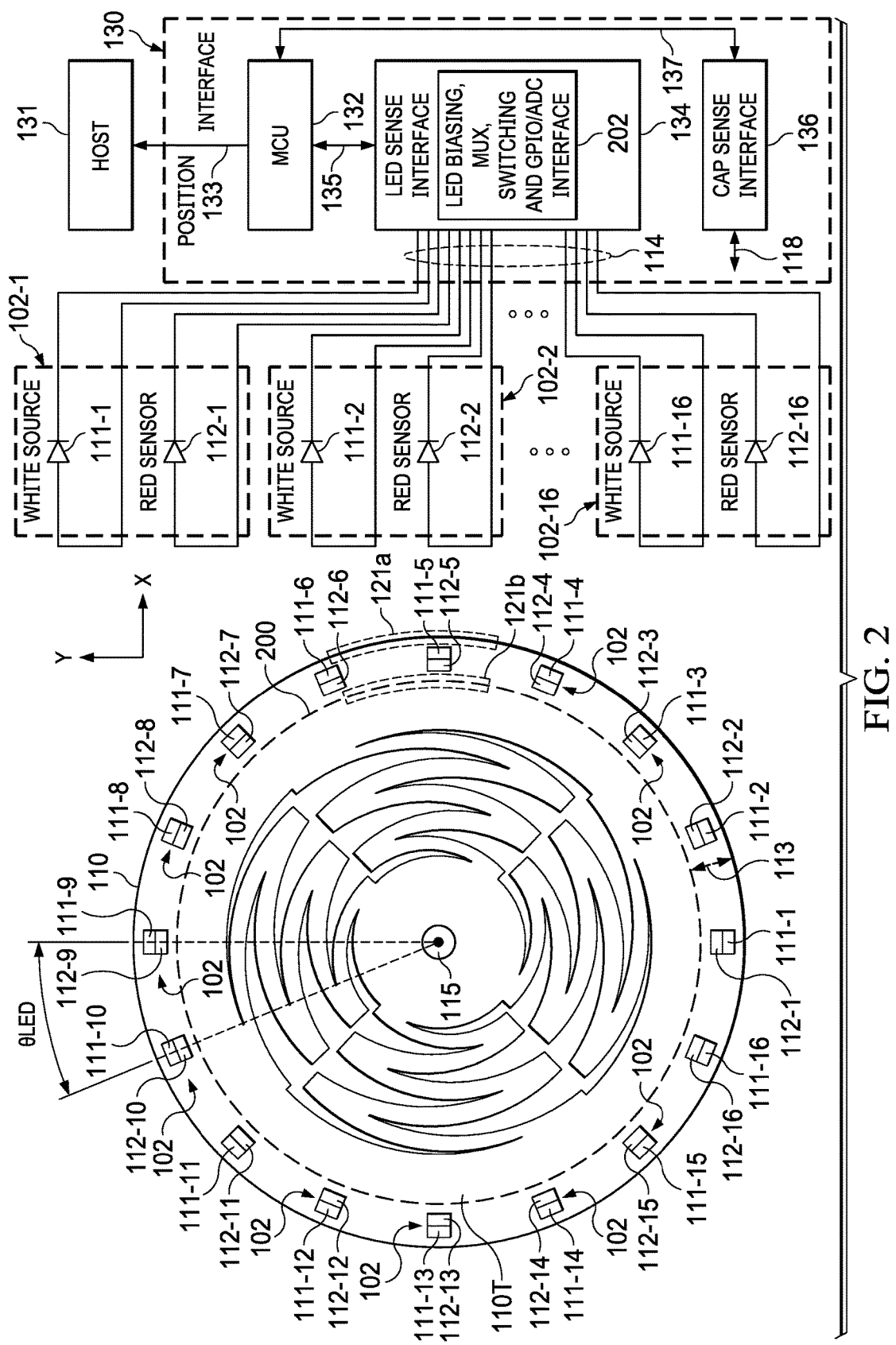
FIG. 2 is a top plan view of the stationary first structure of the control element of FIG. 1 with schematically illustrated optical rotational position detection circuitry.

Referring initially to FIGS. 1 and 2, FIG. 1 shows an example rotational mechanical control element or control apparatus 100 that includes an optical position sensing system and a capacitive position sensing system. The optical and capacitive position sensing systems detect the relative position of a stationary first structure 110 and a rotatable second user interface structure 120 for a user interface. The control apparatus 100 can be used in any form of user interface or HMI, for example, industrial control panels, automobile dashboard controls, etc. The example of FIG. 1 provides a rotational control apparatus 100. Other possible examples include linear user interface control mechanisms, such as slider controls as illustrated and described below in connection with FIG. 12. As previously discussed, capacitive position detection or sensing systems can be used to indicate the relative position of a stationary structure and a movable structure, whether in a rotational configuration or a linear translation configuration. However, capacitive detection systems are susceptible to EMI/RFI. This can be problematic, for example, in industrial environments or other user interfaces positioned near EMI sources. The example control apparatus 100 in FIG. 1 advantageously combines capacitive position sensing with an optical position sensing system, to allow provision of a position signal POSITION to a host system 131 according to either or both of the capacitive and optical systems. In one example, this allows use of the optical detection signals where the control apparatus 100 is subjected to high EMI levels. Moreover, the combined system is robust with respect to optical interference, such as exposure to sunlight or other bright lights, in which case the capacitive position sensing system can provide the POSITION signal to the host system 131. The disclosed examples provide further benefits in using the optical system to also operate as an indicator to provide visual indication to a user of the detected rotational position. The disclosed examples thus provide an elegant cost-effective solution with distinct advantages over capacitive position sensing apparatus for human machine interfaces or user interfaces.

FIG. 1 is a top view of a control knob user interface control apparatus 100 which can be used for a variety of applications, such as a volume knob for a vehicle audio system, and can include a capacitive touch sense on/off button in certain implementations. In the illustrated example, the stationary first structure 110 includes a printed circuit board (PCB) to provide mechanical support for portions of the optical and capacitive systems. The apparatus is positioned in an X-Y plane and the second user interface structure 120 is rotatable about an axis 115 (positive Z direction) relative to the stationary first structure 110. The apparatus 100 provides mechanical support for rotating elements of the optical and capacitive position detection systems. The second user interface structure 110 also includes one or more overlay structures to provide a sealed structure, although not a strict requirement of all possible implementations of the disclosed concepts. In this example, the first and second structures 110 and 120 are generally cylindrical and symmetrical about the axis 115, although other shapes can be used.

In the illustrated example, the first structure 110 includes a first region 113 extending around an outer circumferential periphery of the PCB structure. The first region 113 includes optical device pairs 102 (FIG. 2), each including an LED or other optical source 111 and a second LED or other second optical source 112. The second structure 120 includes a corresponding first region 123 as illustrated and described below in connection with FIGS. 4-8. The first structure 110 also includes a second region 117 disposed radially between the center axis 115 and the first region 113, and the second structure 120 includes a corresponding second region 127 (FIGS. 4-8). The second region 117 of the first structure 110 includes groups of two or more conductive capacitor plate structures 116 to provide an integer number J capacitors, and the second structure 120 includes a conductive structure 122 in the corresponding second region 127. The first region 113, 123 is positioned radially outward of the second region 117, 127 in the illustrated example, with the second region 117 positioned radially between the axis 115 and the first region 113. In other implementations, the first regions 113, 123 can be radially inward of the second regions 117, 127.

The first structure includes a first side 110T, in this case a top side that includes the first and second regions 113 and 117. The first user interface structure 110 includes N pairs 102 of optical source and sensor devices 111, 112, where N is greater than 1. As best shown in FIG. 2, N=16 optical device pairs 102 are positioned in the first region 113 on the first side 110T of the first structure 110, for example, by soldering to the top side 110T of the first structure PCB. The example 16 optical sources 111-1, 111-2, 111-3, 111-4, 111-5, 111-6, 111-7, 111-8, 111-9, 111-10, 111-11, 111-12, 111-13, 111-14, 111-15 and 111-16 are positioned to selectively direct light away from the first side 110T generally toward the bottom side of the rotatable second structure (e.g., out of the page in FIGS. 1 and 2). The first structure 110 also includes N=16 optical sensors 112 (112-1, 112-2, 112-3, 112-4, 112-5, 112-6, 112-7, 112-8, 112-9, 112-10, 112-11, 112-12, 112-13, 112-14, 112-15 and 112-16) positioned in the first region 113 on the first side 110T of the structure 110 to selectively sense light directed toward the first side 110T of the first structure 110 (e.g., sensing direction generally into the page in FIGS. 1 and 2). In the paired configuration, the individual optical sensors 112 are positioned proximate a corresponding one of the optical sources 111, and the optical device pairs 102 spaced from one another along a circumferential first direction 140. In the illustrated example, pairs of LEDs are used, but other optical sources 111 and sensors 112 can be used in other implementations. The LED pairs 102 are generally equally angularly spaced from one another throughout the entire 360 degree angular extent of the first region 113. In other examples, the pairs 102 can be unequally spaced. In other examples, moreover, the pairs 102 can be spaced along less than the full extent of the first region 113 along the direction 140. The LED pairs 102 optically interact with one or more reflective structures 121 and a non-reflective surface of other portions of the second structure 120 provide an optical position sensing system to facilitate optical detection of the rotational position of the second structure 120 relative to the first structure 110 as discussed further below.

As best seen in FIG. 2, the first user interface structure 110 also includes four conductive capacitor plate structures 116-1, 116-2, 116-3 and 116-4 positioned in the second region 117 on the first side 110T of the first structure 110 to form an integer number J=4 capacitors. Any suitable number of one or more capacitor plate structures 116 can be used in different examples to form two or more capacitors. The individual conductive plate structures 116 include tapered fingers extending circumferentially that are laterally spaced from and interleaved with fingers of adjacent plate structures 116 to form four capacitors. Different plate structure shapes and configurations can be used in other implementations. The plate structures 116 and the capacitors formed thereby interact with one or more conductive structures 122 provided on the movable second structure 120 to facilitate detection of the rotational position of the second structure 120 as discussed further below. The conductive capacitor plate structures 116 of the first structure 110 and the conductive structure 122 on the second user interface structure 120 form a capacitive position sensing system that operates alone or in combination with the optical position sensing system.

Figure 4:
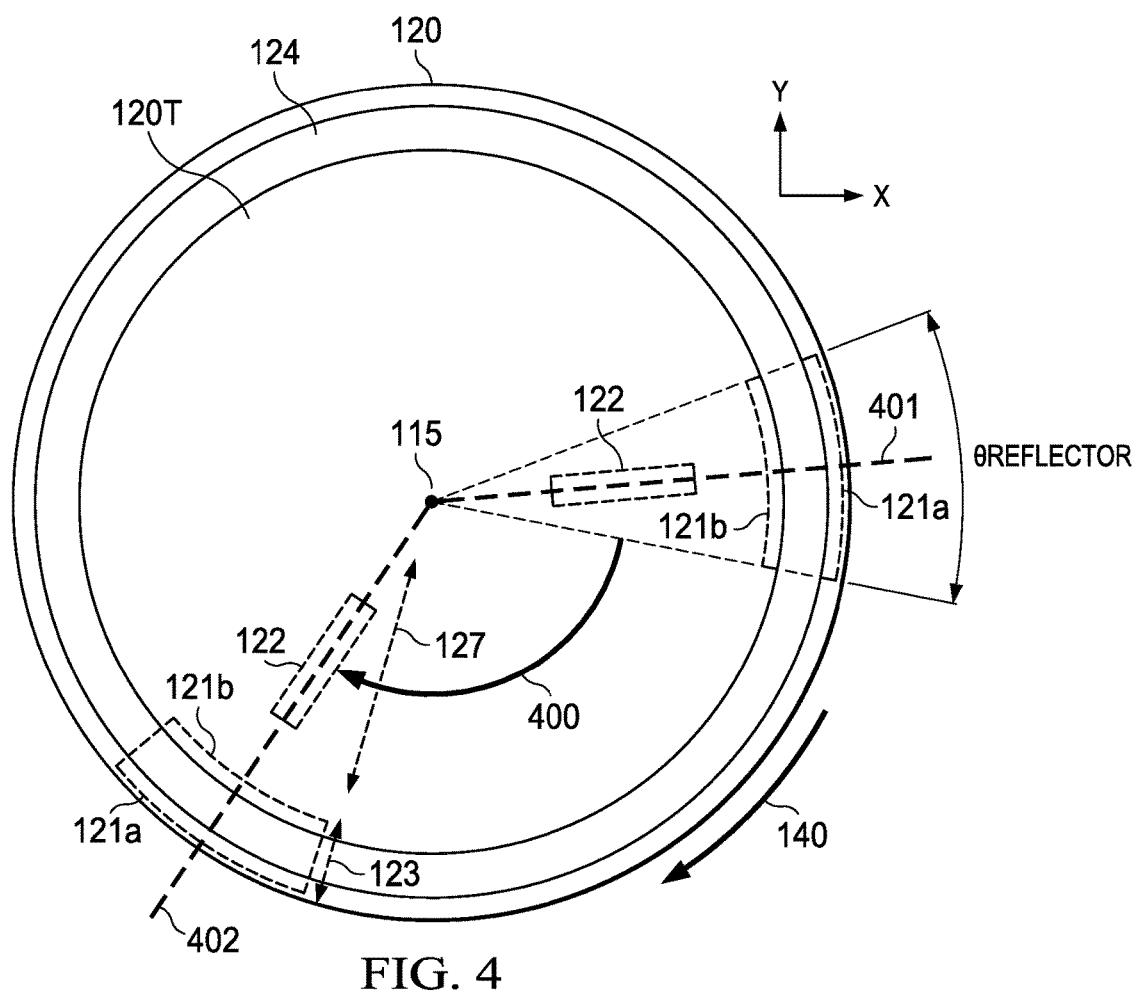
FIG. 4 is a top plan view of the rotatable second structure of the control element of FIG. 1, including an optically transmissive window to allow LEDs of the optical rotational position detection circuitry to operate as user interface position indicators, first and second reflector structures on opposite sides of the window to interface with the optical rotational position detection circuitry of the stationary first structure, and a capacitive modification structure.
Figure 5:
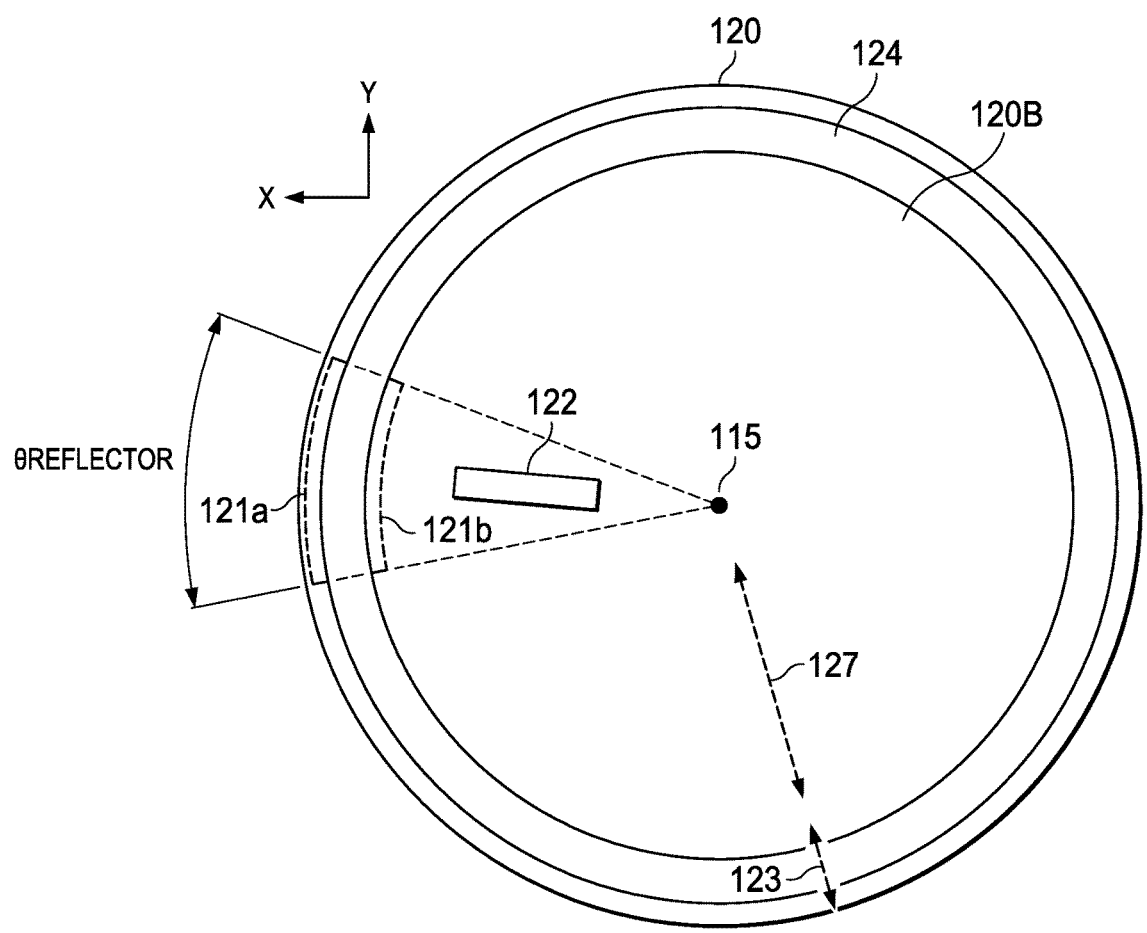
FIG. 5 is a bottom plan view of the rotatable second structure of the control element of FIG. 1, including the capacitive modification structure and the reflector structures.

As best shown in FIGS. 4 and 5, the second user interface structure 120 is movable (e.g., rotatable about the axis 115) along the first direction 140 relative to the first structure 110. Any suitable mechanical mounting apparatus can be used (not shown) to provide movable support for the structure 120 relative to the structure 110. The second structure 120 includes a top or first side 120T, and an opposite bottom or second side 120B that faces the top or first side 110T of the first structure 110. The bottom or second side 120B of the second structure 120 includes the first movable region 123 that faces the first region 113 of the first structure 110, and the second movable region 127 that faces the second region 117 of the first structure 110. One or more reflector structures 121 is or are positioned in the first movable region 123 on the second side 120B of the second structure 120 to move along the first direction 140. In the illustrated example, moreover, the first movable region 123 include a non-reflective surface 800 spaced from the reflector(s) 121 along the first direction 140 on the second side 120B. In operation in one example, the reflector structures 121a and 121b move in the circumferential direction 140 with rotation of the second structure 120 to selectively reflect light from one of the optical sources 111 to the corresponding optical sensor 112 of a given optical device pair 102 when the reflector 121 is positioned proximate the given optical device pair 102. Also, the non-reflective surface 800 selectively mitigates reflection of light from at least one of the optical sources 111 to the corresponding optical sensor 112 of a second given optical device pair 102 when the non-reflective surface 800 is positioned proximate the second given optical device pair 102.

The second user interface structure 120 also includes a conductive structure 122 positioned in the second movable region 127 on the second side 120B. The conductive structure 122 moves with rotation of the second structure 120 along the first direction 140 to selectively modify a capacitance of a given one of the capacitors formed by a given group of two or more of the capacitor plate structures 116 when the conductive structure 122 is positioned proximate the given group of the capacitor plate structures 116. In addition, the second structure 120 in the example of FIGS. 1 and 4-8 includes a transparent window or aperture 124 positioned in the first movable region 123 to allow light from the optical sources 111 to pass through the second structure 120. The aperture can be transparent material in sealed system examples, or an opening that extends through the second structure 120 between the top and bottom sides 120T and 120B. In the illustrated example, reflector structures 121a and 121b are respectively positioned on radially inner and outer sides of the aperture 124 in the first movable region 123 of the second structure 120. As shown in FIG. 8, moreover, the reflector structures 121a and 121b are disposed at angles to reflect light from the optical sources 111 to the corresponding optical sensor 112, while allowing some of the optical source light to exit the transparent aperture 124.

As further shown in FIG. 1, the user interface control apparatus 100 also includes an interface circuit 130 that operates in a first mode to provide the position signal POSITION to the host system 131. The position signal represents the relative position of the second structure 120 to the first structure 110. The interface circuit determines the position signal POSITION according to signals from the optical sensors 112 and signals from the capacitor plate structures 116. In a second mode in this example, the interface circuit 130 selectively illuminates one or more of the LED sources 111 according to the determined position signal POSITION. The apparatus 100 thus provides a rotary control actuator apparatus with optical and capacitive position detection, as well as optical position indication. In one example, the circuit 130 determines the position according to both the optical system signals and the capacitive system signals, and selectively uses the determination having the highest resolution. For example, the illustrated apparatus 100 has a capacitive position sensing system with four quadrants of 90 degree angular widths, to provide potential resolutions of 90 degrees minimum to 1 degree or better. In certain examples, the circuit 130 uses only the optical system or only the capacitive system where the other system is suspect based on computed positions that indicate unreliability in one of the position sensing systems. The circuit 130 in certain examples also determines rotational velocity. In certain implementations, the host system 131 determines rotational velocity based on the position signals POSITION from the circuit 130 over time.

In one example, the interface circuit 130 is provided on the PCB of the first user interface structure 110. The interface circuit 130 in FIG. 1 includes a processor, such as an MCU 132 with a communications interface or output 133 that provides the position signals POSITION to the host circuit 131. The host circuit 131 in one example is a processor or user interface controller to operate a system according to one or more control elements including the rotary knob control apparatus 100. The processor 132 can be any suitable digital logic circuit, programmable or pre-programmed, such as an ASIC, microprocessor, microcontroller, DSP, FPGA, etc., that operates to execute program instructions stored in an internal or external electronic memory (not shown) to implement the features and functions described herein as well as other associated tasks to implement a user interface control apparatus 100. In certain examples, the memory 102 constitutes a non-transitory computer-readable storage medium that stores computer-executable instructions that, when executed by the processor 132, perform the various features and functions detailed herein. The illustrated interface circuit 130 also includes an optical (e.g., LED) sense interface circuit 134 and a capacitive sense interface circuit 136. The processor 132 exchanges data and signaling with the LED sense interface circuit 134 via a communications interface connection 135. The sense interface circuit 134 includes electrical connections 114, such as PCB traces, to interface with the source and sensor optical devices 111 and 112. The capacitive sense interface circuit 136 includes electrical connections 118 to interface with the conductive capacitor plate structures 116. The processor 132 exchanges data and signaling with the capacitive sense interface circuit 136 via a communications interface connection 137.

FIG. 2 shows a top view of the stationary first structure 110 with the second structure 120 removed. The first region 113 in this example extends circumferentially around 360 degrees with a radial extent from the peripheral edge of the structure 110 to a circular inner boundary 200. FIG. 2 also schematically illustrates an example of the interconnection of the LEDs 111 and 112 with the optical rotational position detection circuitry of the LED sense interface circuit 134. The interface circuit 134 includes circuitry 202 for optical device biasing, signal multiplexing and switching, and general purpose input/output (GPIO) interfacing between the processor 132 and the LEDs 111, 112. In one example, the circuit 134 includes biasing circuitry to selectively forward or reverse bias selected ones of the LEDs 111 and/or 112. For example, the circuit 134 in one mode performs optical position sensing under control of the processor 132 by forward biasing one, some or all of the source LEDs 111 and reverse biasing the sensor LEDs 112.

The forward biasing causes the selected source LED(s) 111 to emit or transmit light of an associated first wavelength λ1. Reverse biasing allows the selected sensor LED(s) 112 to sense light of an associated second wavelength λ2 or less. The wavelengths λ1 and λ2 can be the same or different. In the illustrated examples, the first wavelength λ1 is less than or equal to the second wavelength λ2. In one example, the source LEDs 111 are white LEDs and the sensor LEDs 112 are red LEDs. As shown in FIG. 2, the connections 114 allow the circuit 202 to selectively control the anode and cathode voltages and signal conditions of each of the LEDs 111 and 112. The processor 132 in certain implementations includes one or more analog to digital converters (ADCs or A/Ds, not shown), and the circuit 202 includes switching circuitry and voltage supply and signal generators to selectively provide forward and reverse biasing of individual source LEDs 111 and interconnection of selected sensor LEDs 112 to GPIO terminals configured as ADC inputs. This allows the processor 132 to obtain digital values representing the sensor LED voltages to determine whether a given sensor LED 112 is receiving a threshold amount of light from the associated source LED 111 when the source LED 111 is forward biased. This, in turn, allows the processor 132 to determine whether each given optical device pair 102-1, 102-2, . . . , 102-16 is proximate to the movable reflector structure(s) 121, and hence to determine the position of the second structure 120 within the angular spacing resolution θLED of the optical device pairs 102 (e.g., 22.5 degrees in the illustrated example). In other examples, the interface circuitry 202 includes multiplexers (not shown) to allow sharing of a limited number of ADC inputs, and the optical device pairs 102 can be actuated and measured individually or in groups. The circuit 134 can include ADC circuits (with or without input multiplexing), and the ADC circuits provide converted values to the processor 132. In some examples, the processor 132 includes GPIO terminals that can be dynamically configured as digital outputs, digital inputs, analog outputs, analog inputs and/or ADC inputs. In certain examples, the circuit 202 selectively connects individual LED terminals to a high voltage level, a low voltage level, and a DC input or provides a high impedance. The processor 132, in certain examples, controls the LED sense interface circuit 134 in multiphase operations to selectively forward bias one or more of the source LEDs 111 and to reverse bias selected ones of the sensor LEDs 112 to obtain sensor readings and determine the rotational position of the reflector structure or structures 121 relative to the first structure 110.

Figure 3:
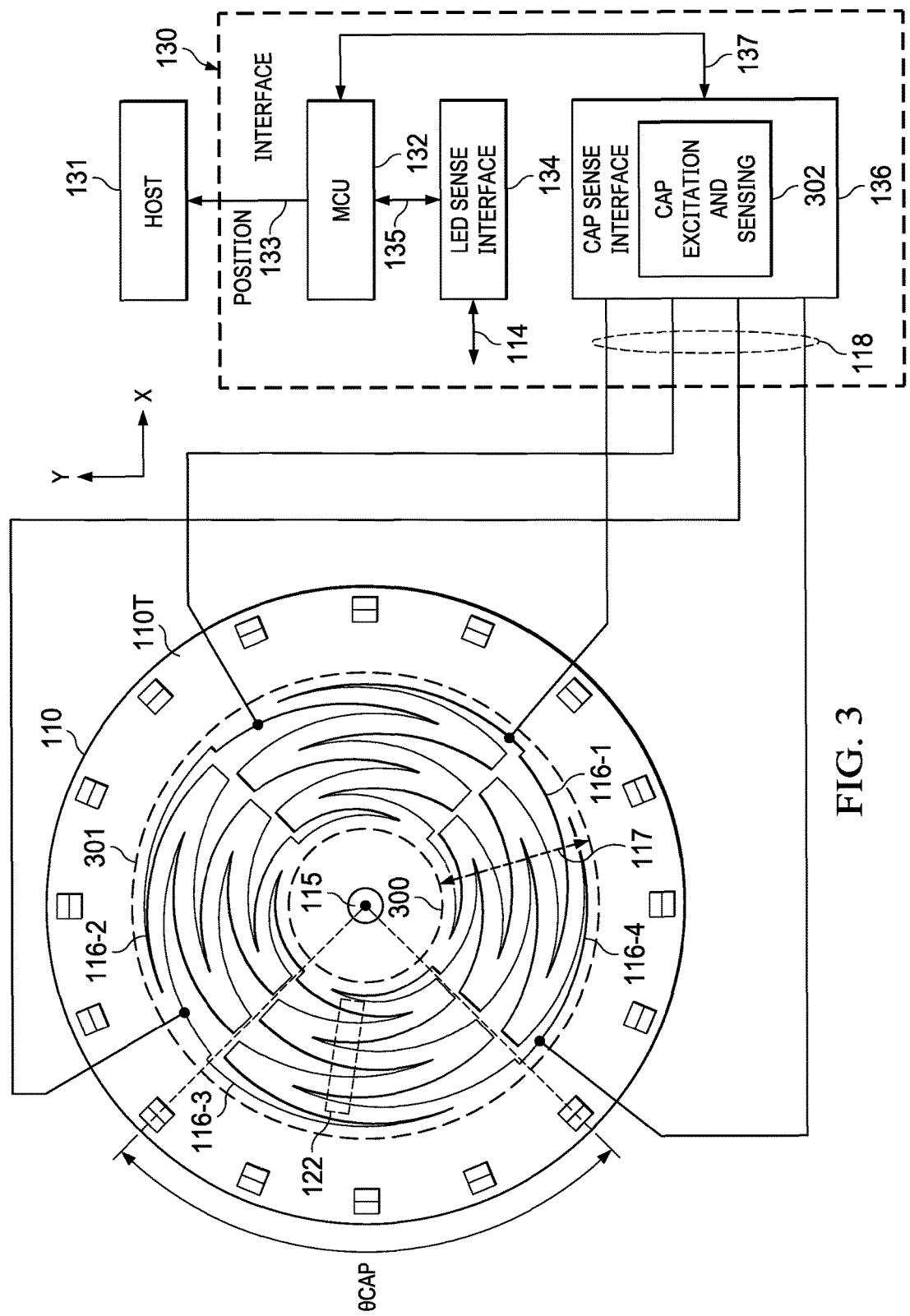
FIG. 3 is a top plan view of the stationary first structure of the control element of FIG. 1 with schematically illustrated capacitive rotational position detection circuitry.

FIG. 3 shows a top view of the first structure 110 and schematically illustrates the capacitive rotational position detection sense interface circuit 136. As seen in FIG. 8 below, the first structure in one example includes a transparent overlay formed above the top side 110T of the first structure 110, not shown in FIG. 3. In this example, the second region 117 extends radially through 360 degrees between a radius 300 spaced from the axis 115 and a boundary 301. The circuit 136 includes capacitor excitation and sensing circuitry 302 that selectively provides excitation voltage or current signals to the capacitor plate structures 116-1, 116-2, 116-3 and 116-4 via the interconnections 118. The circuit 302 also allows connection of ADC inputs (e.g., of internal ADC circuits or GPIO/ADC inputs of the processor 132) to one or more of the plate structures 116 to sense capacitor voltage and/or current signals to determine capacitance changes. The circuitry 136 in one example provides signals or converted values representing voltage and/or currents of the J capacitors formed by the plate structures 116 from which the processor 132 can detect threshold amounts of capacitance variations caused by proximity of the conductive structure 122 of the second structure 120 (FIG. 1) to a given group of the plate structures 116. From this, the processor 132 can determine the rotational position of the conductive structure 122. In other examples (e.g., FIGS. 20 and 21 below), the conductive structure 122 extends at least partially over or near one or more auxiliary conductive PCB traces or other copper area is connected in fixed manner to GND, or by connecting the auxiliary copper on the PCB to a GPIO, which can switch that copper to GND or supply level or to a high impedance state, to enhance the response generated by the conductive structure 122, and also to help distinguish it from the response of a touching finger on the top surface of the structure 120 in the wheel electrode area, as this touch event and respective capacitive response would not be influenced by this GND-VCC-input switching.

FIGS. 4 and 5 respectively show top and bottom views of the rotatable second structure 120. The structure 120 include the optically transmissive (e.g., transparent) window or aperture 124 that allows light from the source optical devices 111 to pass through the structure 120 to exit the tope side 120T. In this manner, the processor 132 (FIGS. 1-3) can control the source LEDs 111 in a second mode to operate as user interface position indicators. In the first mode, the reflectors 121 selectively reflect light from one or more proximate optical device pairs 102 (FIGS. 1-3). The reflector structures 121a and 121b have an angular length or reflector angle θREFLECTOR along the first direction 140. In certain examples, the reflector angle θREFLECTOR is greater than the optical device angle θLED. FIG. 4 shows rotation of the structure 120 through a rotation angle 400 from a first position with the conductive structure 122 aligned with a line 401 to a second position aligned with a line 402. The conductive structure 122 operates as a capacitive modification structure to change a capacitance of a proximate capacitor formed by two of the conductive capacitor plate structures (FIGS. 1-3). As best seen in the bottom view of FIG. 5, the second structure 120 includes the first and second reflector structures 121a and 121b on opposite sides of the window 124 to interface with the optical rotational position detection circuitry of the stationary first structure 110 (FIGS. 1-3).

Figure 6:
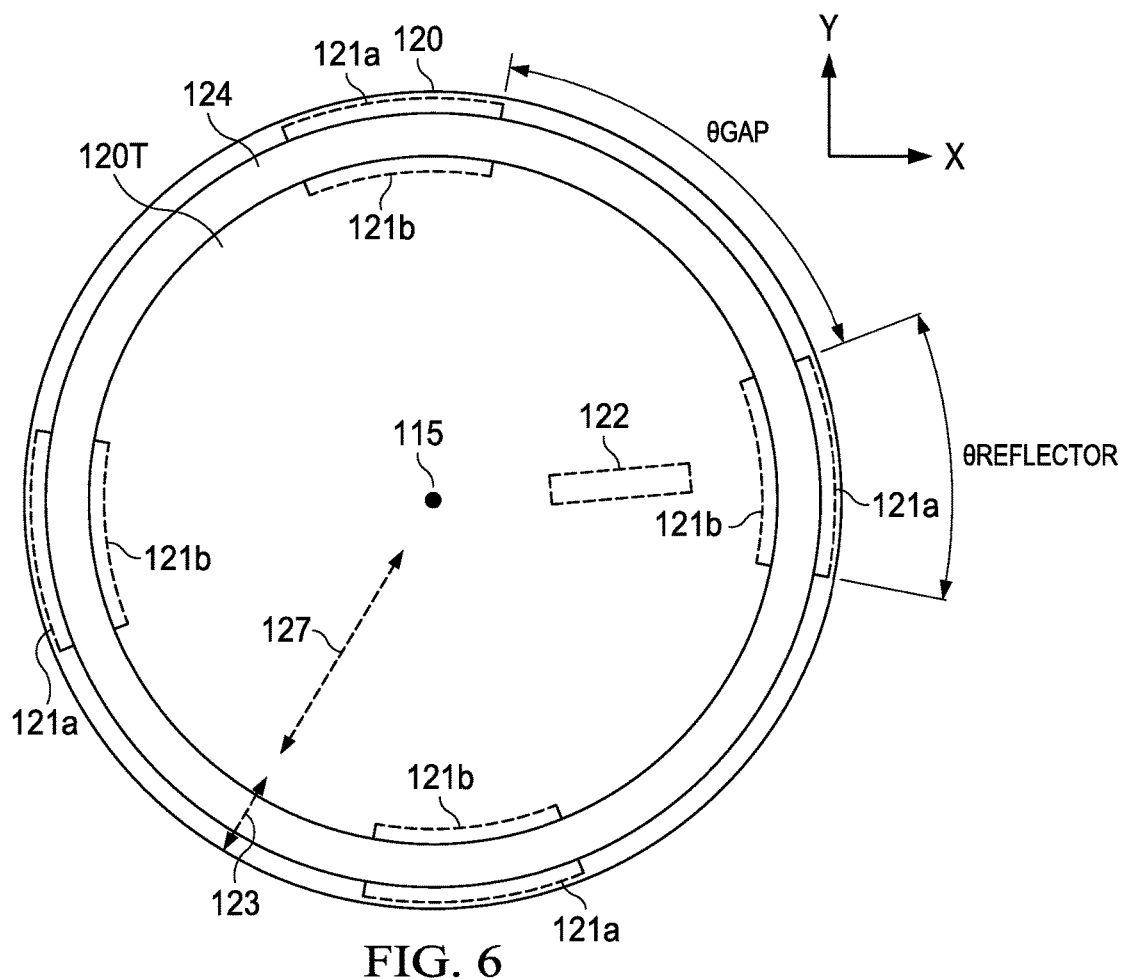
FIG. 6 is a top plan view of another example rotatable second structure, including four sets of first and second reflector structures angularly offset from one another.
Figure 7:
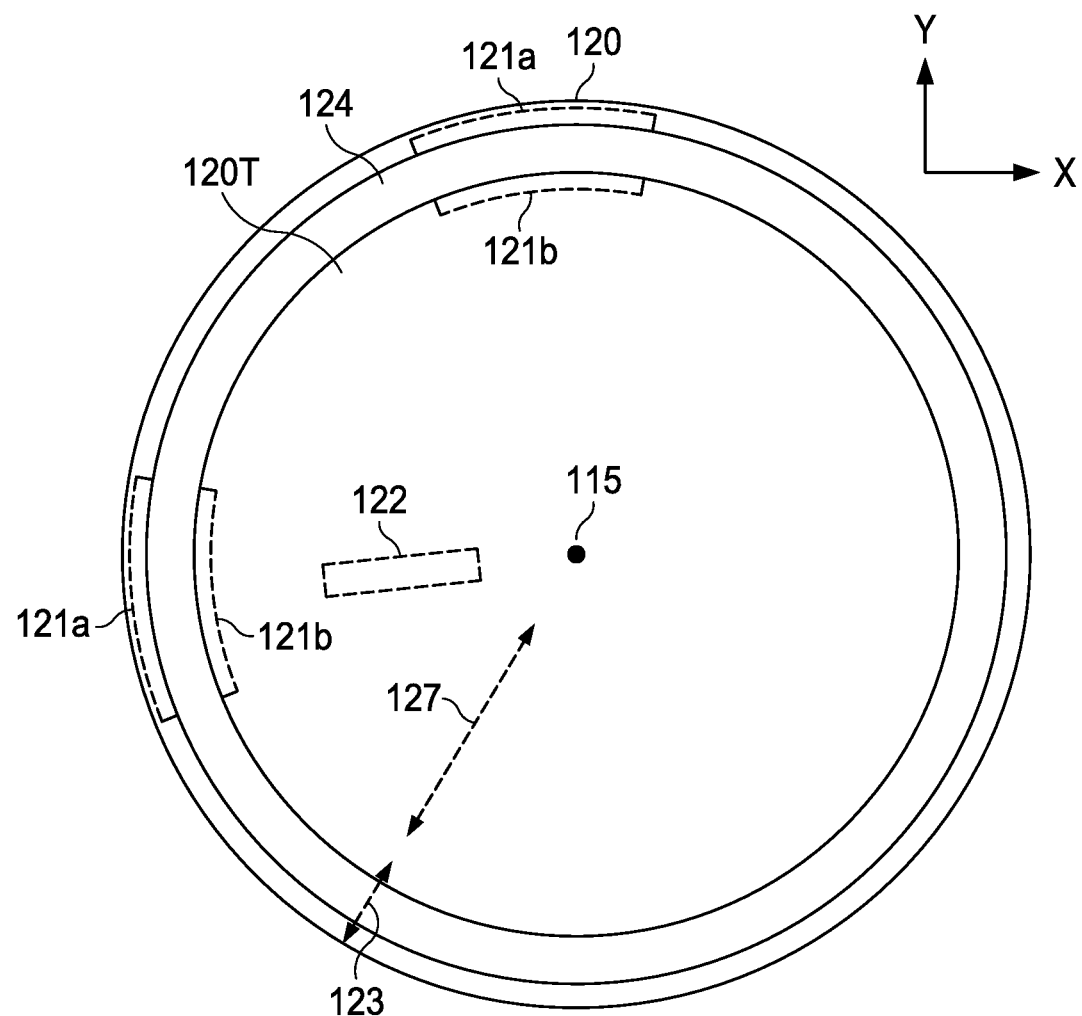
FIG. 7 is a top plan view of yet another example rotatable second structure, including two sets of first and second reflector structures angularly offset from one another.
Figure 8:
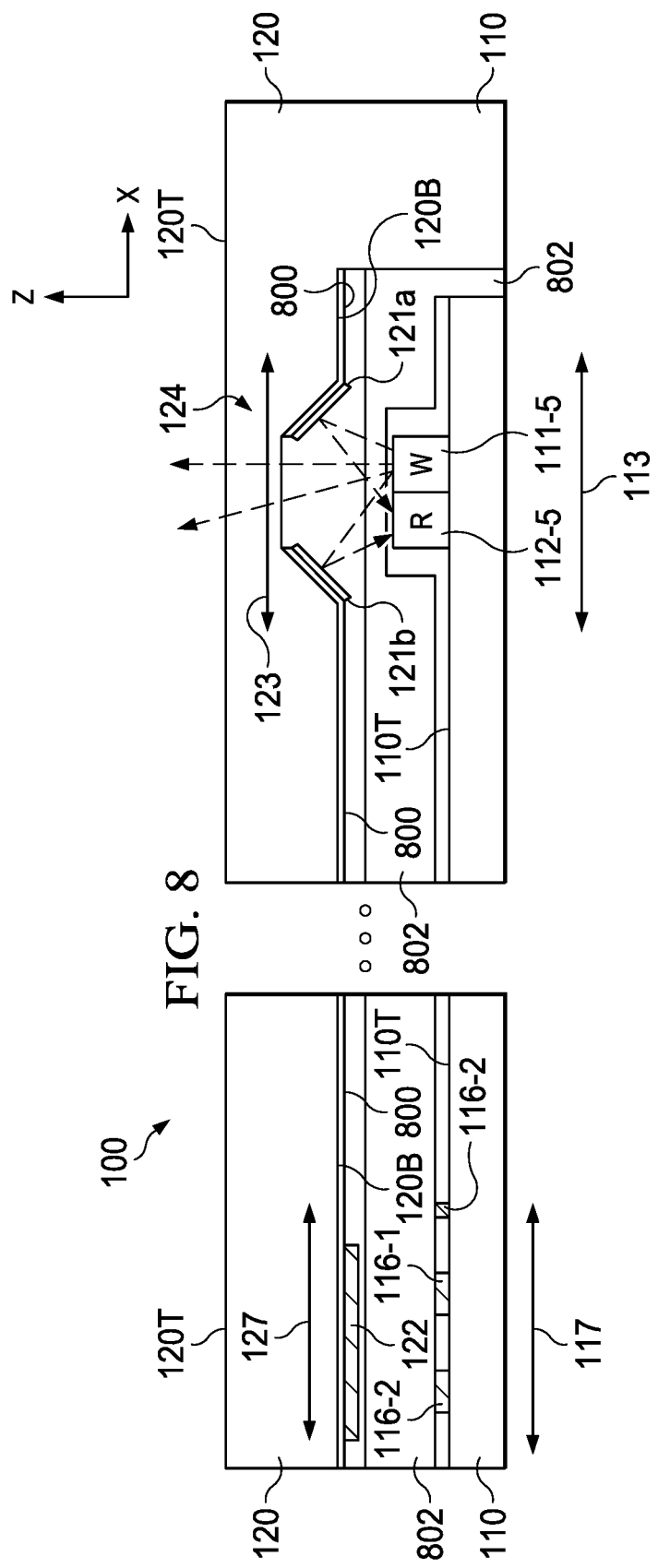
FIG. 8 is a partial sectional side elevation view taken along line 8-8 of the control element of FIG. 1.

FIGS. 6 and 7 are top views of further non-limiting example second structures 120 of another example rotatable second structure 120. The example in FIG. 6 includes four sets of first and second reflector structures 121a, 121b angularly offset or spaced from one another by a gap distance θGAP. Any suitable number of reflector structures 121 can be used in various implementations. The reflector structures 121 can be of similar reflector angles θREFLECTOR as shown in FIG. 6, or different reflector angles can be used in other implementations. FIG. 7 shows another example second structure configuration that includes two sets of first and second reflector structures 121a, 121b that are angularly offset from one another by 90 degrees. Any combination of multiple reflector structures 121 and intervening non-reflective surfaces 800 can be used, where the reflector structures can be of the same or different angular extents θREFLECTOR, and the intervening non-reflective gaps can be of equal or unequal lengths θGAP. The processor 132 implements suitable position estimation algorithms tailored to a particular reflector structure 121 configuration for a given second user-interface structure 120 to determine the second structure relative position according to signals from the optical position sensing system.

FIG. 8 shows a partial sectional side view taken along line 8-8 of the control apparatus 100 of FIG. 1. As seen in FIG. 8, the apparatus 100 includes a PCB first structure 110 having a top surface 110T, with a white LED source 111-5 positioned in the first region 113 on the top side 110T alongside a red sensor LED 112-5. The structure further includes a transparent protective overlay 802 with a bottom side that extends over the top surfaces of the LEDs 111 and 112, and over the tops of the conductive capacitor structures 116-1 and 116-2. A top side of the protective overlay 802 is spaced from a bottom side 120B of the transparent second structure 120. In certain examples, the overlay 802 need not be spaced from the bottom side 120B. The second region 117 includes illustrated portions of the conductive capacitor structures 116-1 and 116-2 formed as conductive traces on the top side 110T of the PCB first structure 110. The second structure 120 includes a first region 123 with the opening or aperture 124 allowing light from the white source LED 111-5 to exit through a transparent overlay material of the second structure 120. In various alternate implementations, the red LEDs 112 and/or the white LEDs 111 can be used to implement optical indicator functionality, including without limitation, time division multiplexing and GPIO multiplexing. In one example, the color used for position indication can be adapted to a user preference setting for a host system, and can be adapted based on ambient lighting conditions or other system conditions. The bottom side 120B of the transparent second structure 120 includes a non-reflective coating 800. The first and second reflector structures 121a and 121b are formed in the illustrated section of FIG. 8 over the non-reflective coating 800 in a concave region of the second structure 120 such that the reflectors 121 are angled in order to reflect light emitted by the white source LED 111-5 at least partially to an upper sensing face of the red sensor LED 112-5, while the aperture 124 allows a certain amount of the emitted light from the source LED 111-5 to pass through the transparent structure 120 to exit the top side 120T of the rotating second structure 120.

The illustrated portion of the movable second structure 120 also includes the second movable region 127 with the conductive capacitance modifying structure 122 formed on the bottom side 120B. In the illustrated example, the non-reflective coating 800 is formed over most of the bottom side 120B, including in the second movable region 127 of the second structure 120. In other examples, the non-reflective coating can be selectively applied to only portions of the bottom side 120B, for example, only in the first movable region 123, with the reflector structures 121 formed over the non-reflective coating surface 800 to provide selective reflection of light from the source LED 111 to the corresponding sensor LED 112 when the reflector 121 is positioned proximate the given optical device pair 102. In the illustrated examples, the non-reflective surface 800 is positioned in the first movable region 123 on the second side 120B. The positioning or mounting of the reflector structures 121 provides spacing between the exposed portion of the non-reflective surface 800 and the reflector 121 along the first direction 140 to selectively mitigate reflection of light from at least one of the optical sources 111 to the corresponding optical sensor 112 of a second given optical device pair 102 when the non-reflective surface 800 is positioned proximate the second given optical device pair 102. This configuration allows a given optical device pair 102 to sense either a lighted or illuminated condition or an obscured or "dark" condition based on the rotational position of the second structure 120 relative to the stationary first structure 110.

The first interface circuit 134 is coupled via the connections 114 to selectively provide optical excitation signals (e.g., forward biasing) to selectively illuminate at least some of the optical sources 111. In addition, the interface circuit 134 selectively receives optical sense signals from the optical sensors 112 in response to illumination of the optical sources 111. As previously discussed, in certain examples, the first interface circuit 134 includes a multiplexer 202 to selectively connect a shared general purpose input/output GPIO line or a shared analog to digital converter ADC line to a selected terminal of a selected one of the optical sources 111 or to a selected terminal of a selected one of the optical sensors 112. The second interface circuit 136 is coupled via the connections 118 to selectively provide capacitor excitation signals to at least some of the conductive capacitor plate structures 116. The interface circuit 136 selectively receives capacitor sense signals from at least some of the conductive capacitor plate structures 116 in response to provision of the capacitor excitation signals.

The disclosed examples advantageously confine optical and capacitive position sensing systems and associated functions during operation in a first mode (position sensing mode). This preserves the benefits of low cost sealed capacitive position sensing solutions, while providing redundancy via the optical position sensing system for high EMI/RFI conditions under which capacitive sensing is unreliable. In addition, the combined optical and capacitive position sensing of the disclosed apparatus 100 allows reliable position sensing via the capacitive technique in conditions where the optical system may be unreliable (e.g., direct sunlight or other high lighting levels). In addition, the apparatus 100 provides an optical rotational position indication via the optical devices 111 during operation in a second mode, and the combined position sensing functionality thus adds no overhead in terms of electronic components, and offers both capacitive HMI in combination with a mechanical rotation or slider position detection (e.g., FIGS. 12 and 13 below).

Figure 9:
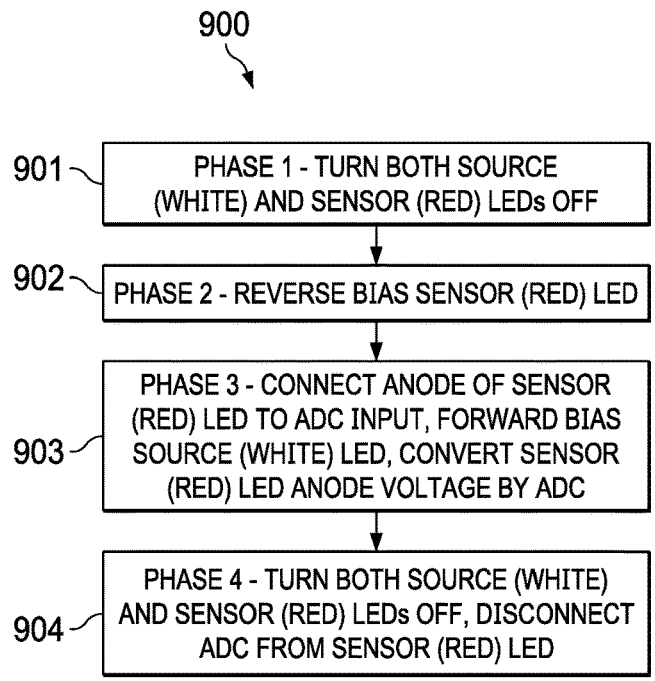
FIG. 9 is a flow diagram of a method to flash a source LED and sense a sensor LED of the optical rotational position detection circuitry of the stationary first structure of the control element of FIG. 1.

FIG. 9 provides a flow diagram of a multiphase method or process 900 to flash a source LED 111 and sense a sensor LED 112 in the first mode to optically sense the rotational position of the second structure 120 relative to the stationary first structure 110. The process 900 is implemented by the processor 132 in one example during operation in the first (position sensing) mode. In certain examples, the multiphase process 900 is implemented concurrently for all optical device pairs 102. In other examples, multiplexing of GPIO and/or biasing connections is implemented, and the process 900 can be performed on individual optical device pairs 102 or on groups of optical device pairs 102. In a first phase at 901, the processor 132 turns both the source LEDs 111 (e.g., white) and the sensor LEDs 112 (e.g., red) off. In certain implementations, the sensor LEDs 112 can be connected to one or more voltages during the first phase at 901. Another implementation, no voltages are applied to the sensor LEDs 112 in the first phase at 901. In a second phase at 902, the sensor LEDs 112 are reversed biased. For instance, the processor 132 in one example connects the cathode of the sensor (e.g., red) LEDs 112 to an ADC input in the second phase at 902. In a third phase at 903, the processor 132 connects the anode of the sensor LEDs 112 to an ADC input, forward biases the source (e.g., white) LEDs 111, and initiates an analog-to-digital conversion to sample and convert a voltage signal sensed from the anode of the sensor (e.g., red) LEDs 112. The conversion at 903 may include sampling and converting multiple samples of the sensor LED cathode voltage in order to obtain a response curve including multiple readings over time. In a fourth phase at 904, the processor 132 turns off both the source (e.g., white) LEDs 111 and the sensor (e.g., red) LEDs 112, and disconnects the sensor (red) LEDs 112 from the ADC.

In certain examples, the processor 132 operates in the first mode according to the process 900, and determines the position of the second structure 120 along the direction 140 according to the readings from the sensor LEDs 112, and then selectively illuminates one or more of the source LEDs 111 in the second mode to indicate the determined position. The processor 132 operates in this fashion by alternately implementing the first and second modes. In certain implementations, the operation of the second mode is the primary function, and the first mode (position sensing) can be implemented for a very short time interval, such that the selective flashing of the source LEDs one and in the first mode is extremely fast such that the position sensing operation is not visibly detectable by a user, and the duration of the first mode operation is sufficiently long to facilitate reading of the received sensor LED signals to determine the position.

Figure 10:
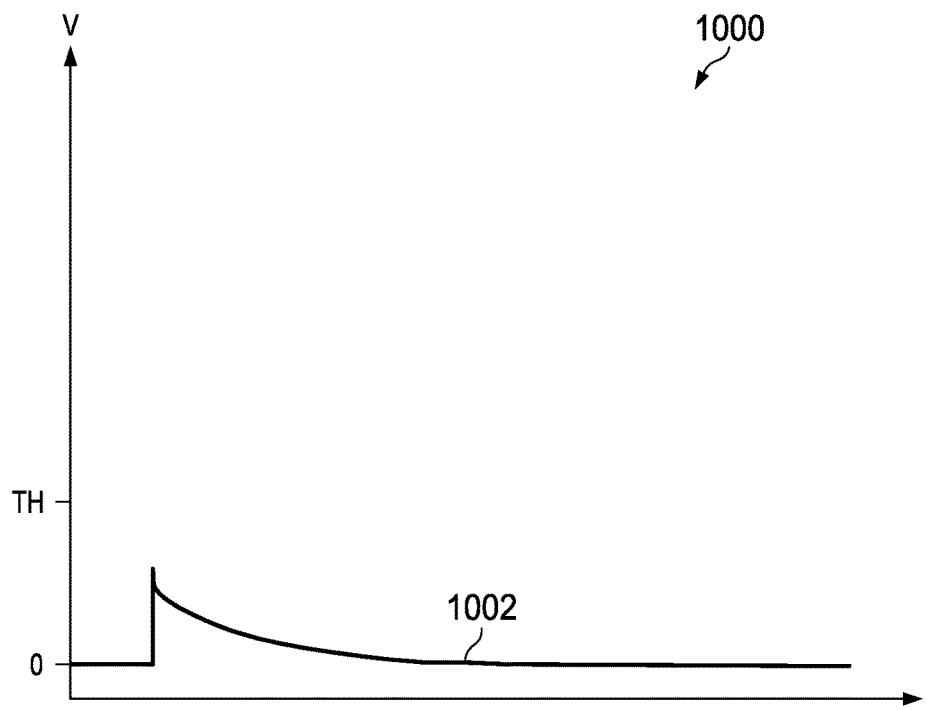
FIG. 10 is a graph of a sensor LED voltage waveform for a sensor LED spaced from the first and second reflector structures of the rotatable second structure of the control element of FIG. 1.
Figure 11:
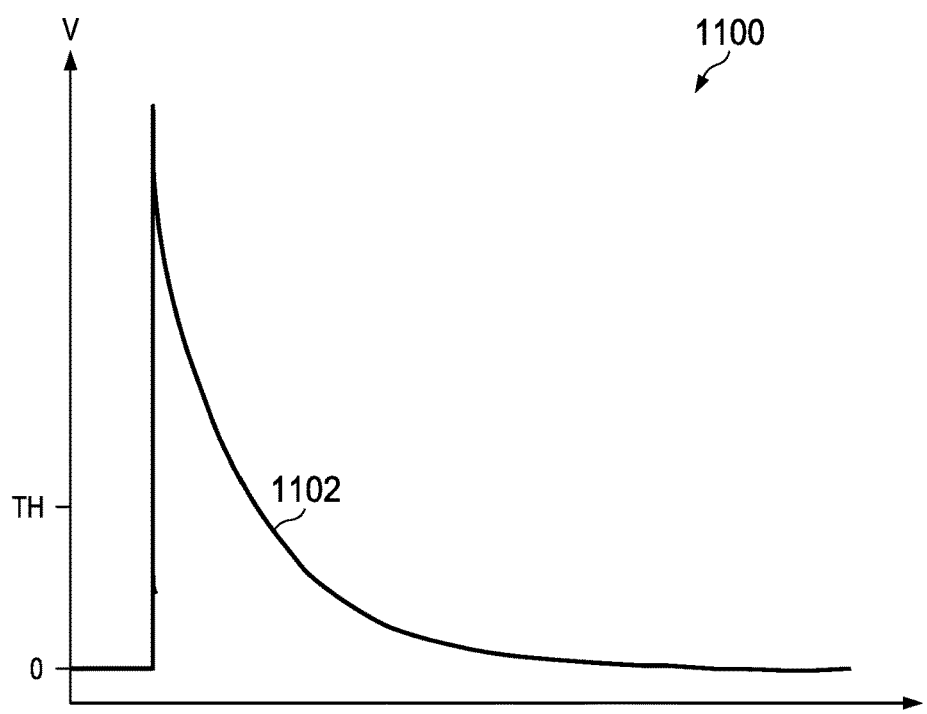
FIG. 11 is a graph of a sensor LED voltage waveform for a sensor LED proximate the first and second reflector structures of the rotatable second structure of the control element of FIG. 1.

Referring also to FIGS. 10 and 11, FIG. 10 provides a graph 1000 showing a sensor LED voltage waveform 1002 in the first mode for a sensor LED 112 spaced from the first and second reflector structures 121 of the rotatable second structure of the control element of FIG. 1. In this example, the voltage waveform 1002 is converted by analog-to-digital conversion in the interface circuit 130, and the resulting digital values for at least portions of the illustrated waveform 1002 are evaluated by the processor 132 in order to determine whether the received light signal exceeds a threshold value TH. A decision based on a fixed threshold is a simple and straight forward example, but with different ambient light conditions the base level of the signal 1002 and thus also the maximum peak of the signal 1002 in case of the reflector being next to the sensing LED will be higher compared to low ambient light levels. Other examples can use an adjustable or adapted threshold, for example, by implementing baseline tracking based on the sensing of all the sensor LEDs. In one possible implementation, if all LEDs sense a higher base level, then it can be assumed the control element is exposed to higher level of ambient light. Accordingly the threshold can be adjusted based on the baseline sensed ambient lighting condition. In addition other possible implementations, further factors can contribute to more robust detection by not only using the pure threshold for the measured sensor, but comparing the values of all the measured sensors, and looking for the dominant sensor with the highest difference in the response. In the example of FIG. 10, the voltage waveform curve 1002 corresponds to a sensor LED 112 that is spaced from the reflector structure or structures 121, and the non-reflective surface 800 of the second structure 120 does not direct a significant amount of light to the sensor LED 112. Accordingly, the curve 1002 in FIG. 10 corresponds to a "dark" sensed condition for the corresponding optical device pair 102. A graph 1100 in FIG. 11 illustrates a sensor LED voltage waveform 1102 for a sensor LED 112 that is proximate the first and second reflector structures 121*a* and 121*b* of the rotatable second structure 120. In this condition, the reflector structures 121 direct a significantly higher amount of light to the sensor LED 112, and the voltage waveform curve 1102 exceeds the threshold value TH. The processor 132 evaluates the converted digital values corresponding to the curve 1102 and determines that the threshold TH has been exceeded, and accordingly implements one or more algorithms to determine the second structure position based on the "lighted" condition at the location of the corresponding optical device pair 102.

Figure 12:
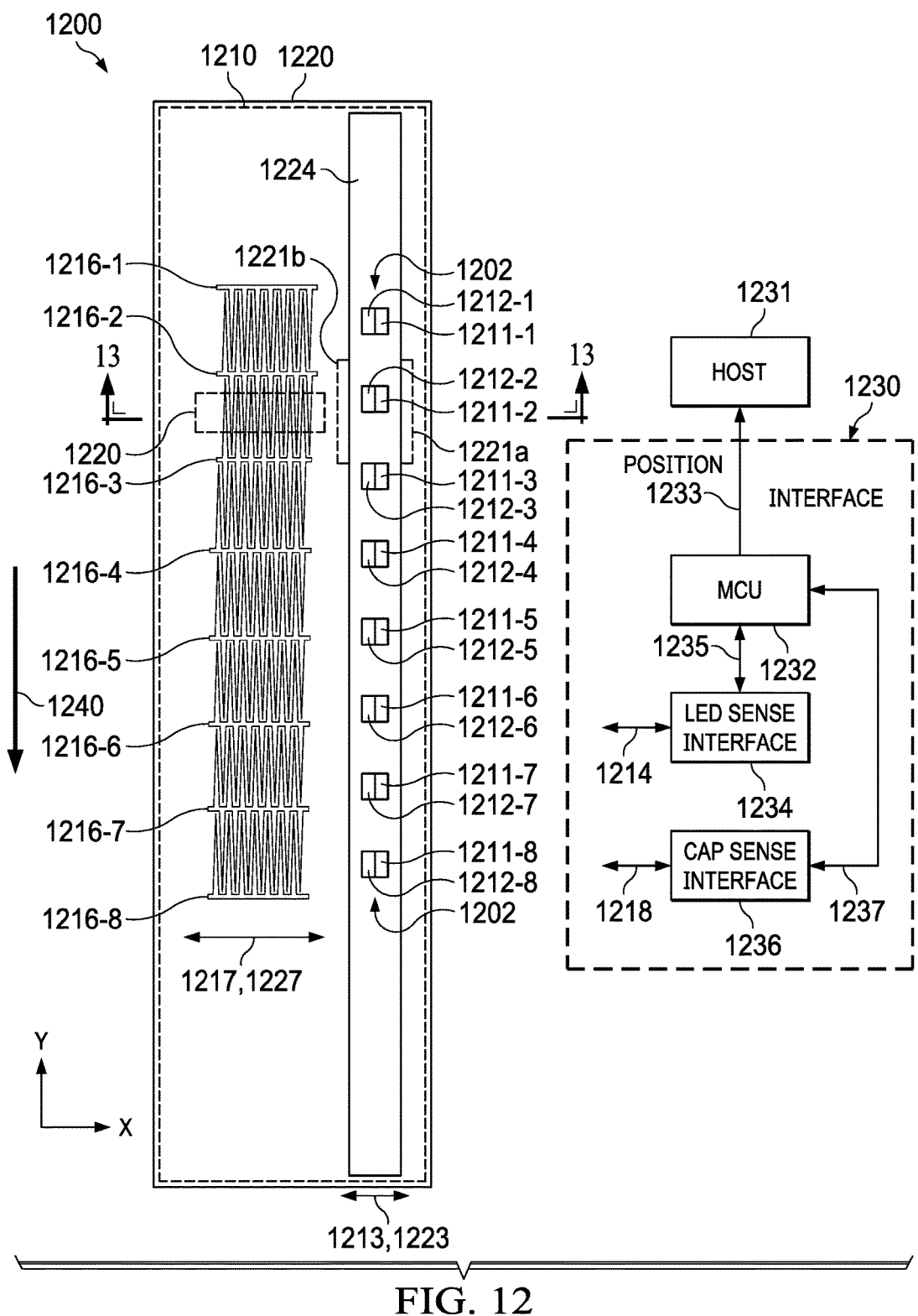
FIG. 12 is a top plan view of a linear mechanical control element including a stationary first structure and a translatable second structure for a user interface with capacitive and optical rotational position detection.
Figure 13:
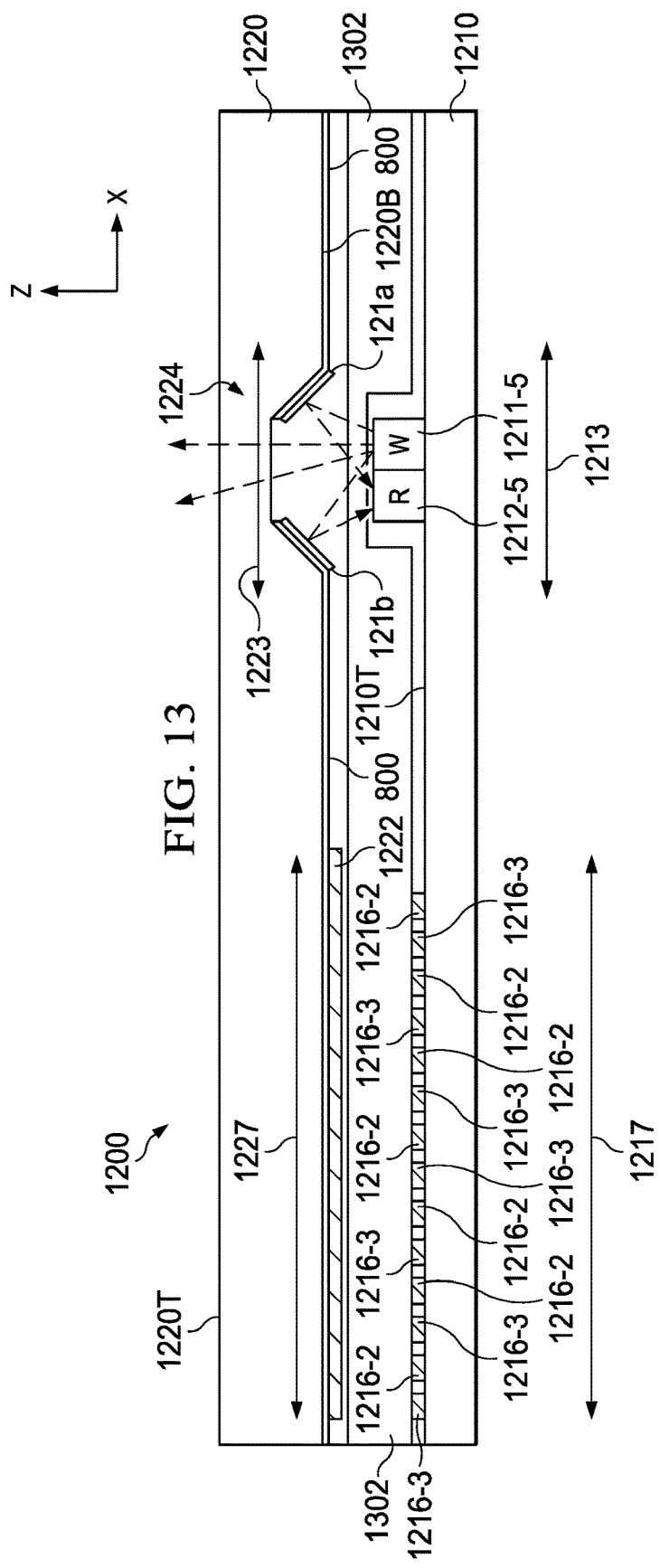
FIG. 13 is a partial sectional side elevation view taken along line 13-13 of the control element of FIG. 12.

Referring now to FIGS. 12 and 13, FIG. 12 shows a linear mechanical control apparatus 1200, with a stationary first structure 1210 and a linearly translatable second user interface structure 1220 for a user interface or HMI. The control apparatus 1200 operates in generally similar fashion to the rotational apparatus 100 discussed above, with the second structure 1220 translatable along a linear first direction 1240 (along the Y direction) relative to the stationary first structure 1210. Like the apparatus 100 discussed above, the control apparatus 1200 of FIGS. 12 and 13 includes both capacitive and optical linear position detection features, and also provides the additional benefit of position indication using LED optical devices 1211. The first structure 1210 includes a first side 1210T with laterally spaced (along the X direction) longitudinally extending first and second regions 1213, 1217. FIG. 13 shows a sectional side view of the control apparatus 1200 taken along line 13-13 in FIG. 12. The first structure in FIG. 13 also includes a transparent protective overlay 1302 with a bottom side that extends over the top surfaces of the LEDs 1211 and 1212, and over the tops of the conductive capacitor structures 1216-2 and 1216-3. A top side of the protective overlay 1302 is spaced from a bottom side 1220B of the transparent second structure 1220.

As seen in FIG. 13, the second structure 1220 includes corresponding movable first and second regions 1223 and 1227. The linear apparatus 1200 includes an optical position sensing system with N=16 LED optical sources 1211 positioned in the first region 1213 on the first side 1210T of the first structure 1210 to selectively direct light away from the first side 1210T. In one implementation, the first structure 1210 is a PCB, and the source LEDs 1211 soldered to the top side 1210T of the PCB structure 1210 are individually paired with a corresponding sensor LED 1212 to form corresponding optical device pairs 1202 spaced from one another along the longitudinal direction 1240 in the first region 1213. The source LEDs 1211 direct light upward (in the positive Z direction) for position indication and position sensing functions, and the second structure 1220 includes an aperture or transparent window 1224 allowing light from the source LEDs 1211 to pass through the second structure 1220 in the positive Z direction to be seen by a user. In addition, the second structure 1220 includes a non-reflective surface 800 and reflector structures 1221*a* and 1221*b* disposed on laterally opposite sides of the aperture 1224. As best shown in FIG. 13, moreover, the reflector structures 1221 are positioned at angles to selectively reflect some emitted light from the source LEDs 1211 to the corresponding sensor LEDs 1212 of a given optical device pair 1202 proximate the reflector structures 1221. The reflector structure(s) 1221 extend along the first direction 1240 by a reflector distance along the first direction 1240. In the illustrated example, the reflector distance is greater than the optical device spacing distance.

Although a single pair of reflector structures 1221 is used in the illustrated example, any number of reflector structures can be used, including multiple structures 1221 spaced from one another along the direction 1240 (Y direction), and the spacings can be the same or different. Moreover, multiple reflector structures 1221 can be provided with unequal spacing between along the direction 1240, with portions of the non-reflective surface 800 exposed to the optical devices 1211, 1212 between the reflector structures 1221.

As seen in FIG. 12, the first structure 1210 also includes conductive capacitor plate structures 1216 positioned in the second region 1217 on the first side 1210T to form an integer number J capacitors. Unlike the interleaved finger structures 116 in the rotary apparatus 100, the capacitor plate structures 1216 in the linear example of FIG. 12 are linearly extending interleaved finger structures 1216-1, 1216-2, 1216-3, 1216-4, 1216-5, 1216-6, 1216-7 and 1216-8 to provide J=7 capacitors connected by connections 1218 to a capacitor sense interface circuit 1236. The second structure 1220 includes a bottom or second side 1220B with a conductive structure 1222 in the second movable region 1227 facing the second region 1217 of the first structure 1210. Depending on the position of the second structure 1220, the conductive structure 1222 selectively modifies the capacitance of a given one of the capacitors formed by a given group of the capacitor plate structures 1216 when the conductive structure 1222 is positioned proximate the given group of the capacitor plate structures 1216.

As shown in FIG. 12, the apparatus 1200 includes an interface circuit 1230 with a processor (e.g., MCU) 1232 having an output 1233 that provides the POSITION signal to a host system 1231. The POSITION signal represents the relative position of the second structure 1220 to the first structure 1210 along the first direction 1240 according to signals from the optical sensors 1212 and/or signals from the capacitor plate structures 1216. The processor 1232 includes a communications interface 1235 to exchange data with an optical (LED) sense interface circuit 1234 having connections 1214 to the optical devices 1211, 1212. In addition, the processor 1232 includes a communications connection 1237 to exchange data with a capacitive sense interface circuit 1236. The interface circuits 1234 and 1236 in one example are configured as described above in connection with the interface circuits 134 and 136 of the rotational control apparatus 100. In addition, the processor 1232 is programmed to determine the linear position of the second user interface structure 1220 relative to the stationary first user interface structure 1210 using the above described programming and functionality.

Figure 14:
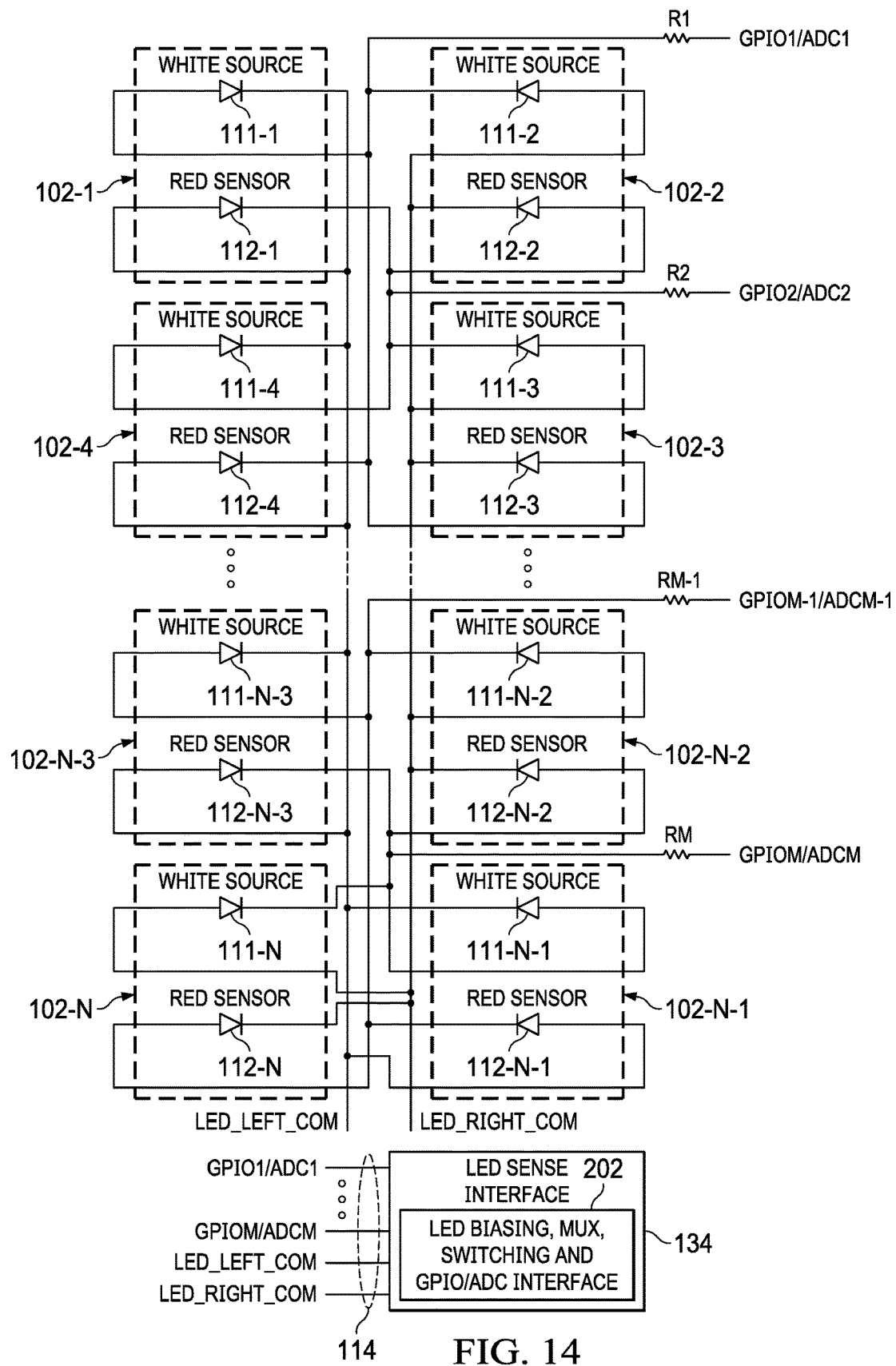
FIG. 14 is a schematic diagram of an example circuit configuration for LED biasing, multiplexing, switching and GPIO/ADC interfacing in the control element of FIG. 1.
Figure 15:
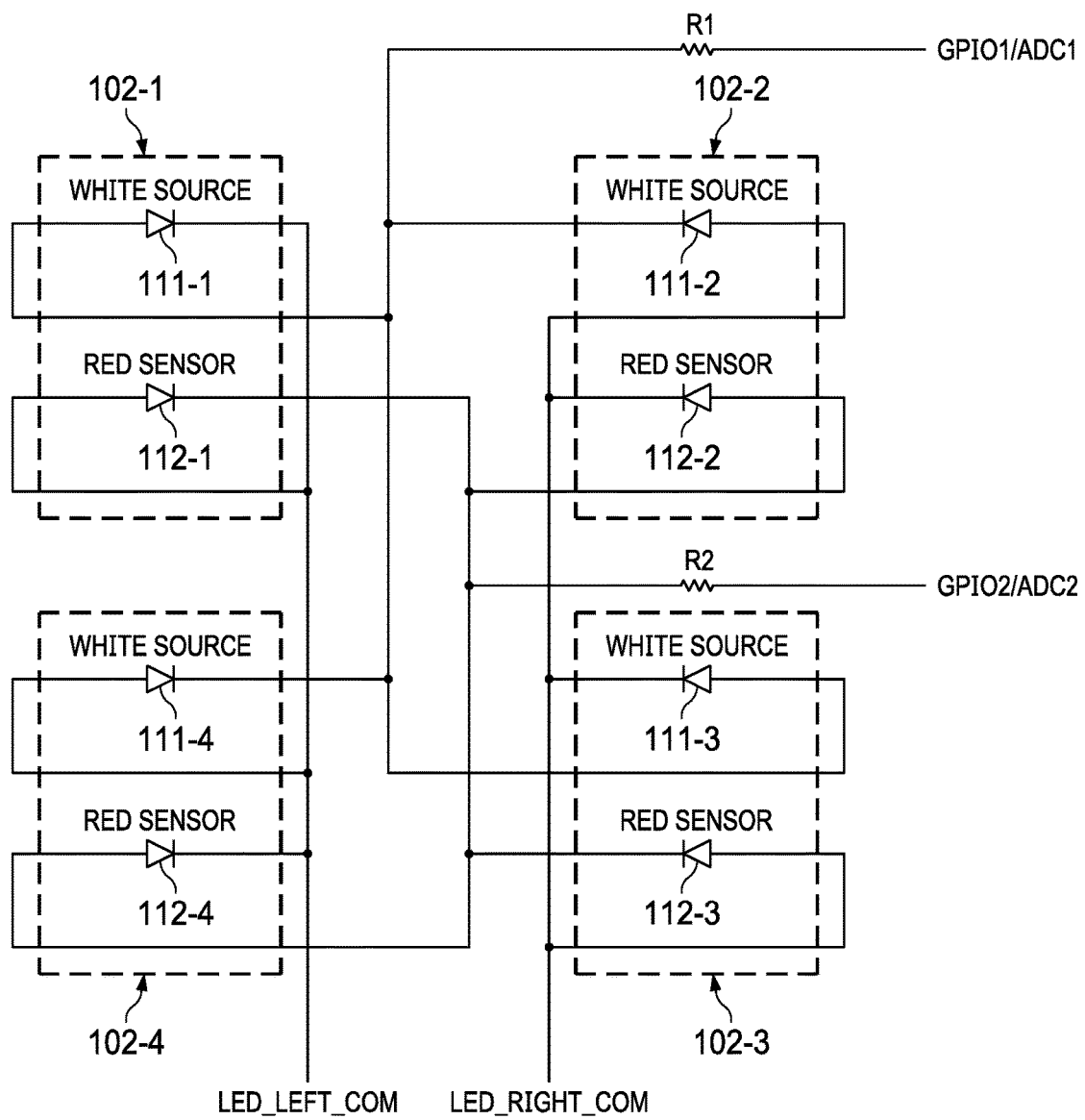
FIG. 15 is a schematic diagram of an example multiplexing configuration for activation and sensing of four source/sensor LED pairs using two GPIO lines.

Referring now to FIGS. 14-18, any suitable excitation and sensing circuitry 134, 1234 can be used to operate the optical position sensing system in the apparatus 100, 1200. FIG. 14 shows an example circuit configuration for LED biasing, multiplexing, switching and GPIO/ADC interfacing in the control apparatus 100 of FIG. 1, and similar circuitry can be used in the linear example 1200 of FIGS. 12 and 13. In this example, an integer number N LED pairs 102-1, 102-3, . . . , 102-N-1, and 102-N are grouped into sets of four, with each set sharing a pair of M GPIO/ADC connections 114 (GPIO1/ADC1, GPIO2/ADC2, . . . , GPIOM-1/ADCM-1 and GPIOM/ADCM) from a multiplexer or switching circuitry of the LED biasing, multiplexing, switching and GPIO/ADC interface circuit 202 configured between the LED sets and the processor 132, where M<N. Each of the connections GPIO1/ADC1 through GPIOM/ADCM is connected by a corresponding resistor R1, R2, . . . , RM-1, RM to a corresponding circuit node associated with the LED set, and the M sets also include connections to two common circuit nodes labeled LED LEFT COM and LED RIGHT COM in FIG. 14. The sensing LED 112 in each pair 102 is used in reverse polarity mode for sensing and the flashing of the source LED 111 influences the sensed output voltage pulse at the cathode of the reverse biased sensor LED 112. The difference of the response of the sensing LED 112 for a bright or dark condition can be measured either by an ADC or a Comparator, and the level is dependent on the light intensity as shown in FIGS. 10 and 11 above.

In the multiplexed configuration of FIG. 14, one example implementation of the four-phase position sensing operation 900 (e.g., FIG. 9 above) is described below. In this example, the processor 132 in the first phase (901 in FIG. 9) sets the four connections GPIO1, GPIO2, LED_LEFT_COM and LED_RIGHT_COM as follows: GPIO1=Output Hi, LED_LEFT_COM=HiZ, GPIO2=Output Hi, and LED_RIGHT_COM=HiZ. In the second phase (902), the processor 132 sets the connections as follows: GPIO1=Output Hi, LED_LEFT_COM=HiZ, GPIO2=ADC input, and LED_RIGHT_COM=HiZ. In the third phase (903 in FIG. 9), the processor 132 sets the connections as follows: GPIO1=Output Hi, LED_LEFT_COM=Output Lo, GPIO2=ADC input, and LED_RIGHT_COM=HiZ. In the fourth position sensing phase (904), the processor 132 sets the connections as follows: GPIO1=Output Lo, LED_LEFT_COM=Output Lo, GPIO2=ADC input, and LED_RIGHT_COM=HiZ.

In another reversed LED functionality implementation, the processor 132 sets the connections as follows in the first phase (901 in FIG. 9): GPIO1=Output Lo, LED_LEFT_COM=HiZ, GPIO2=Output Lo, and LED_RIGHT_COM=HiZ. In the second phase (902) in this example, the processor 132 sets the connections as follows: GPIO1=ADC input, LED_LEFT_COM=HiZ, GPIO2=Output Lo, and LED_RIGHT_COM=HiZ. In the third phase (903), the processor 132 sets the connections as follows: GPIO1=ADC input, LED_LEFT_COM=Output Hi, GPIO2=Output Lo, and LED_RIGHT_COM=HiZ. In this example, the processor 132 sets the connections as follows in the fourth phase (904 and FIG. 9): GPIO1=HiZ, LED_LEFT_COM=HiZ, GPIO2=HiZ, and LED_RIGHT_COM=HiZ.

Figure 16:
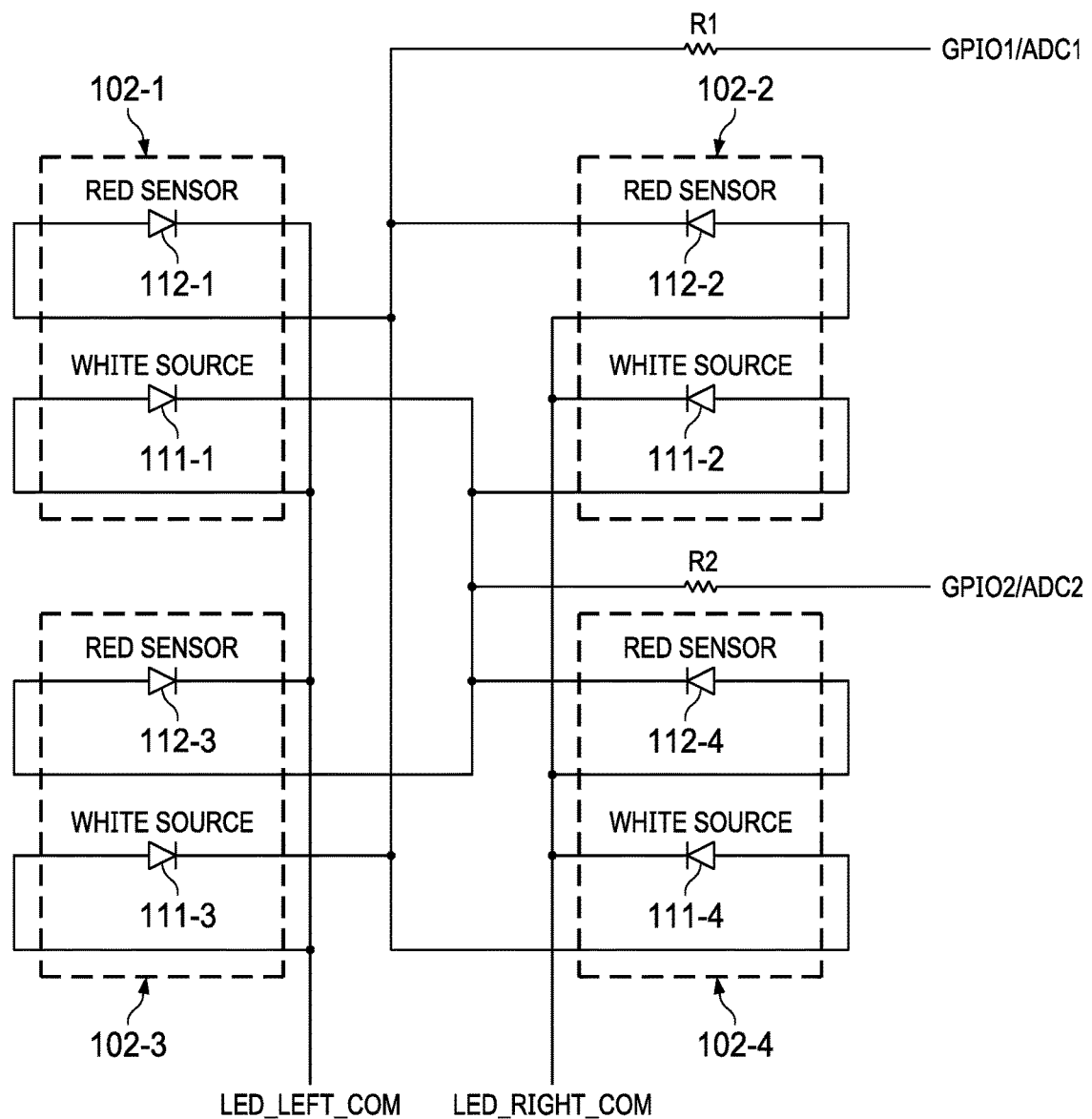
FIG. 16 is a schematic diagram of another example multiplexing configuration for activation and sensing of four source/sensor LED pairs using two GPIO lines.
Figure 17:
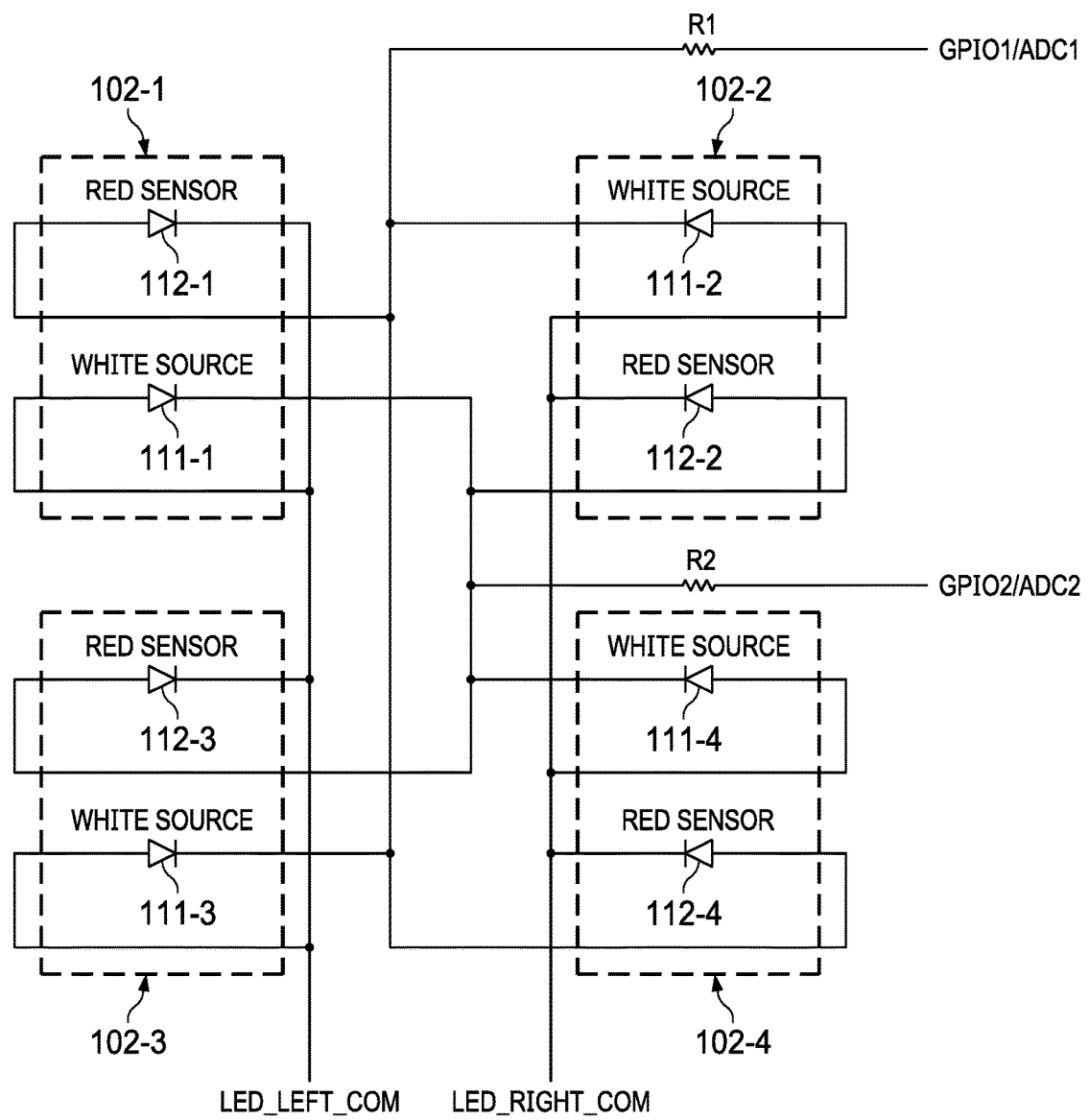
FIG. 17 is a schematic diagram of another example multiplexing configuration for activation and sensing of four source/sensor LED pairs using two GPIO lines.

Referring also to FIGS. 15-18, FIG. 15 shows another example multiplexing configuration for activation and sensing of four source/sensor LED pairs 102-1 through 102-4 using two GPIO lines. In this example, for a group of 8 LEDs (4 LED pairs 102 in this case), only one analog sensing input, e.g., ADC input is needed. In this example, moreover, the second GPIO GPIO2 provides an analog functionality. One shortcoming of this example is the relative measurement of half of the red LEDs 112 is done with respect to GND and the other half are measured with respect to a supply voltage. FIG. 16 shows another example multiplexing configuration for activation and sensing of four source/sensor LED pairs using two GPIO lines. In this example, the interface circuit 134 provides to analog sensing inputs, e.g., ADC inputs. Moreover, this configuration measures half of the sensor LEDs 112 with respect to GND, and the other half with respect to the supply voltage. FIG. 17 shows yet another example multiplexing configuration for activation and sensing of four source/sensor LED pairs using two GPIO lines. In this case, the anodes of the red sensor LEDs 112 are always connected to the analog sensing pin, in this case a multiplexed input. In this example, the response of the sensing LEDs 112 is a positive voltage that begins and exhibits at ground level, exhibiting a light dependent positive voltage characteristic that can be compared with a threshold by a comparator circuit (or converted digital values of the signal waveform can be compared with a threshold value). For a reversed biased sensor LED 112 having a cathode connected to a sensing input, a negative response voltage signal would be provided relative to a supply or high output level which be the slow apply voltage of the processor 132 in certain implementations, which is not desirable, as the analog sensing circuitry, e.g., an ADC, usually does not offer a bandgap referenced upper reference voltage at supply level, but at lower levels, e.g., 2.5 V. In one implementation, the positive supply voltage can be used as reference, but with the disadvantage of translating all the supply noise to the conversion results of the sensed signal.

Figure 18:
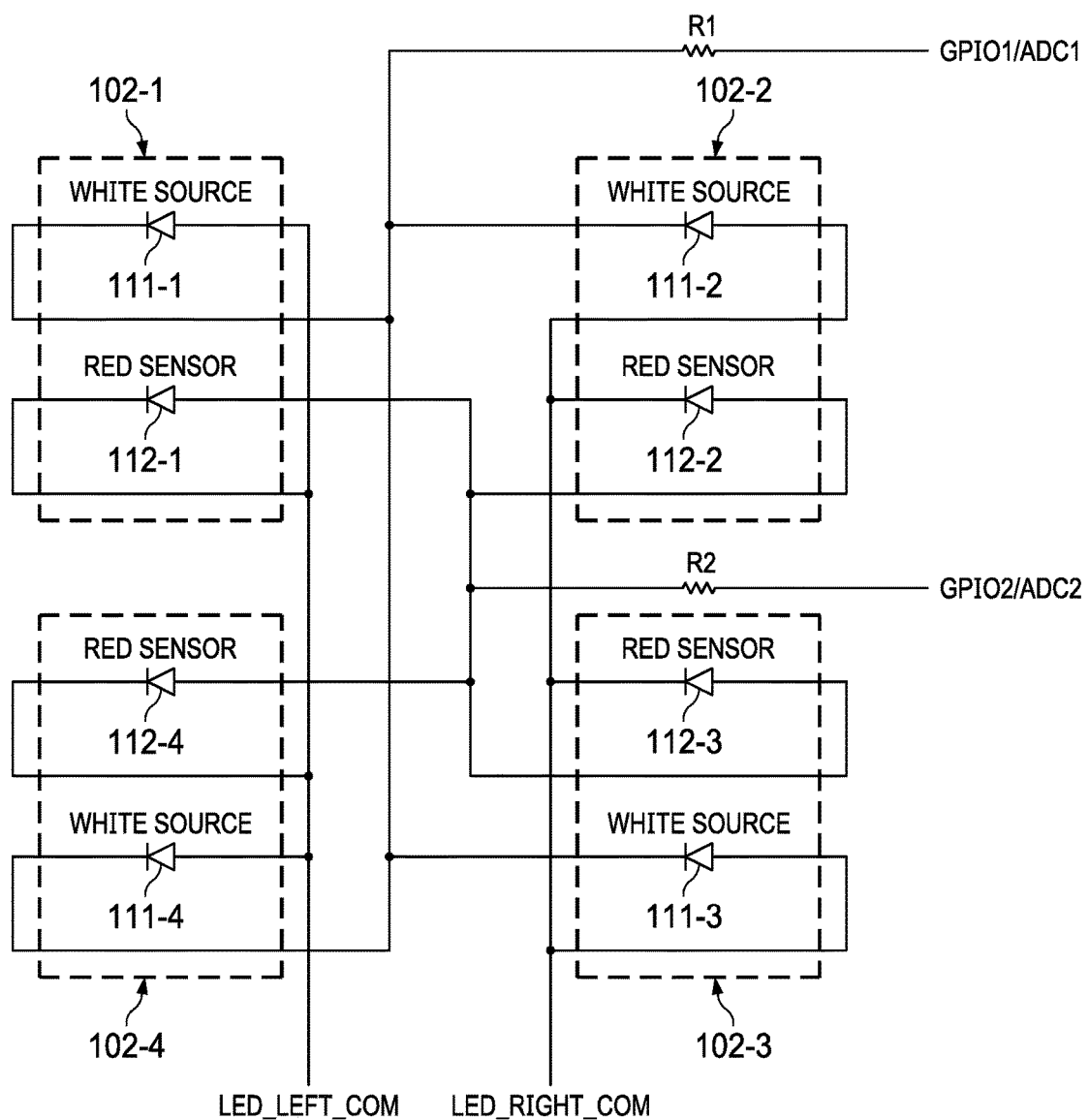
FIG. 18 is a schematic diagram of another example multiplexing configuration for activation and sensing of four source/sensor LED pairs using two GPIO lines.

FIG. 18 shows another example multiplexing configuration for activation and sensing of four source/sensor LED pairs using two GPIO lines. In this example, the red sensor LEDs 112 are all referenced to GND, and the anodes of the red sensor LEDs 112 are connected to the ADC input. The circuit advantageously uses a single GPIO for connection of all the red sensor LEDs 112, and only one of the GPIOs provides analog sensing functionality. This further economizes on their GPIO/ADC input requirements by intelligent multiplexing/switching circuit interconnections of the LEDs 111, 112.

Figure 19:
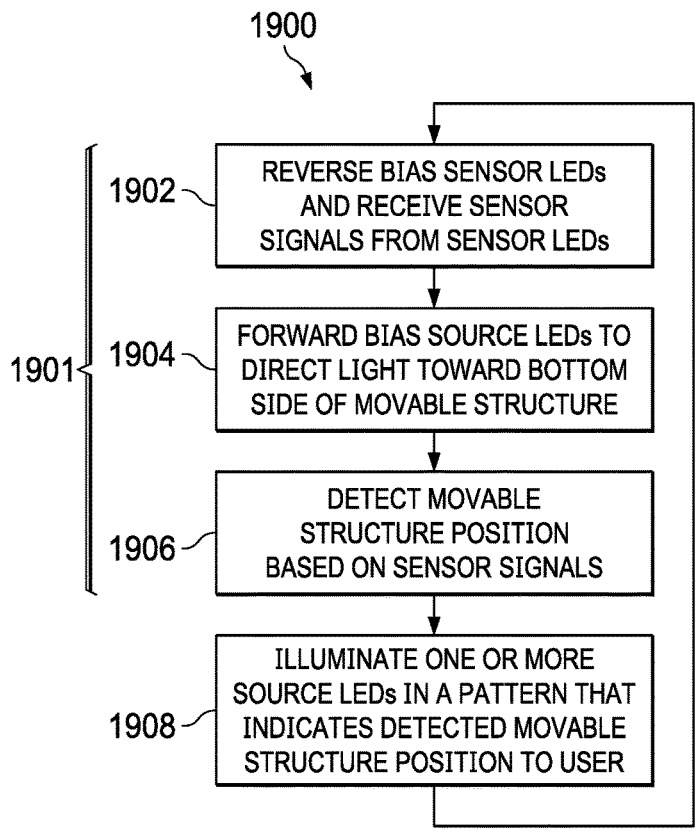
FIG. 19 is a flow diagram of a method for detecting relative positions of first and second user interface structures.

FIG. 19 shows a method 1900 for detecting relative positions of first and second user interface structures. The method 1900 can be implemented in any suitable analog or digital system, such as by the processor 132, 1232 of the illustrated control apparatus examples 100 and 1200. The method 1900 includes operation in a first mode 1901 for position sensing, as well as operation in a second mode 1908 to provide an optical indication of a sensed position. The method 1900 can be used in rotational examples or linear user interface control applications. The first mode 1901 in FIG. 19 includes reverse biasing the sensor optical sources at 1902 (e.g., source optical devices 112, 1212) positioned along a first direction on a first side of a first user interface structure. At 1904, the method further includes forward biasing the source LEDs (e.g., 111, 1211) to direct light toward the bottom side of a movable structure. In this manner, the method includes receiving sensor signals from a plurality of optical sensors (e.g., sensor optical devices 112, 1212) that are positioned along the first direction on the first side of the first user interface structure. In one example, the processing at 1902 and 1904 includes reverse biasing sensor LEDs and receiving sensor signals from the sensor LEDs 112, 1212. At 1906, in the first mode 1901, the method 1900 includes detecting the relative positions of the first and second user interface structures based on the sensor signals from the optical sensors. The process 1900 then begins operation in the second mode at 1908, including illuminating one or more of the optical sources in a pattern that indicates the detected relative positions of the first and second user interface structures. In certain examples, after operating in the second mode 1908 for a predetermined amount of time, the process 1900 returns to operate in the first mode 1901, and operation thereafter continues with alternating operation in the first and second modes.

Figure 20:
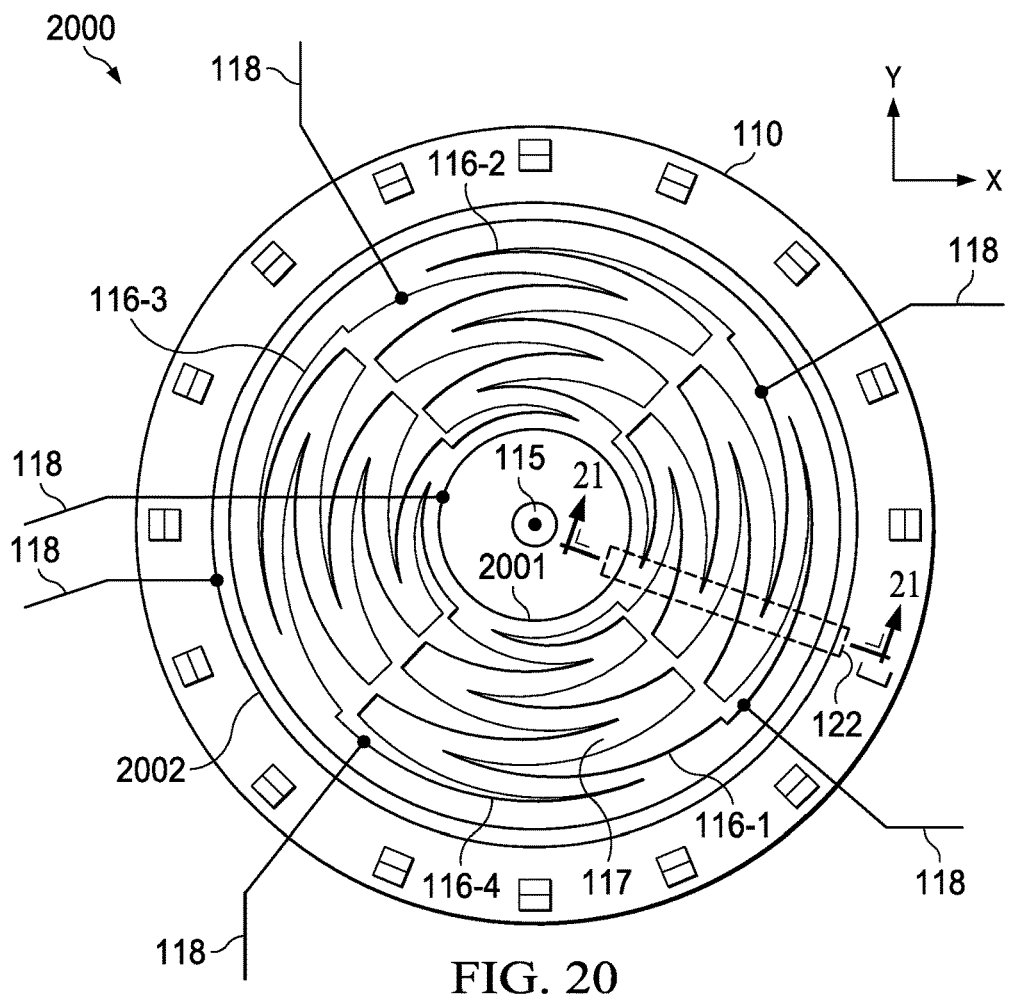
FIG. 20 is a top plan view of another example stationary first structure of the control element with capacitive rotational position and touch detection features including four interleaved wheel electrodes as well as inner and outer auxiliary electrodes.
Figure 21:
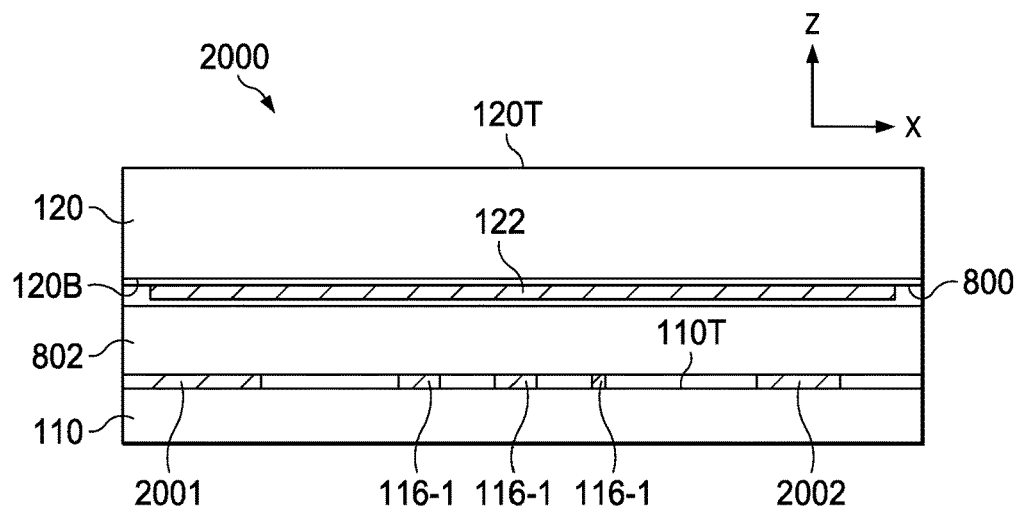
FIG. 21 is a partial sectional side elevation view taken along line 21-21 in FIG. 20.
Figure 22:
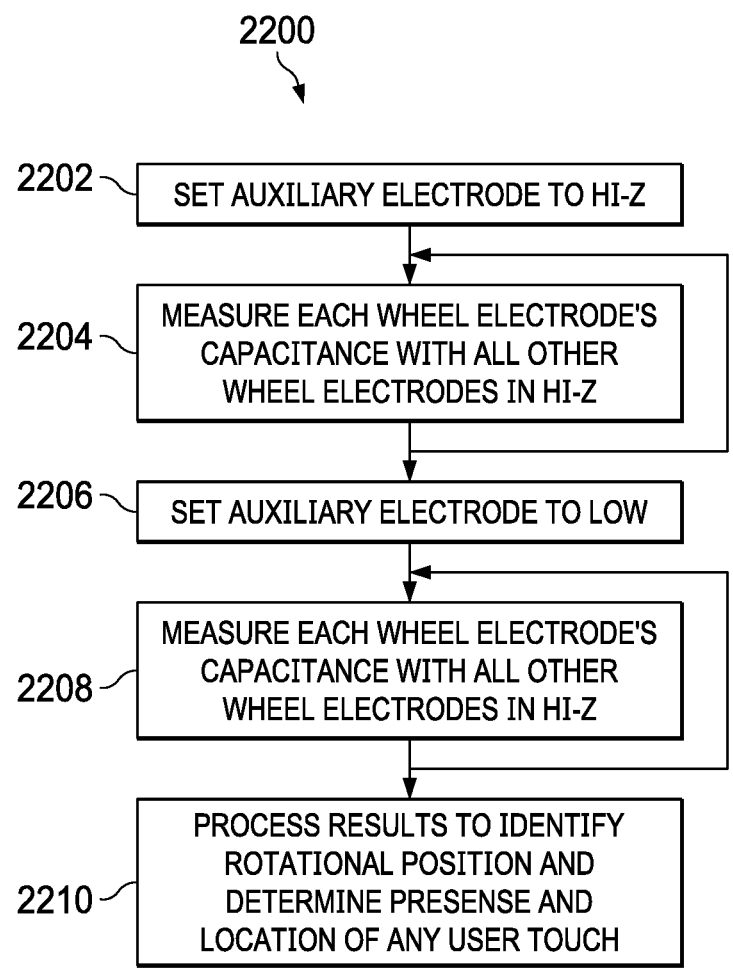
FIG. 22 is a flow diagram of a method for detecting relative positions of first and second user interface structures and detecting user touching of the rotational second structure in the example of FIGS. 20 and 21.

Referring now to FIGS. 20-22, further examples provide capacitive position detection in addition to capacitive touch event detection, which can be used alone or in further combination with the above-described optical position detection. Although shown and described in a rotary configuration, linear examples are possible. FIGS. 20 and 21 show a user interface system 2000 including an example stationary first structure 110 generally as described above, which further includes inner and outer auxiliary electrodes (auxiliary conductive structures) 2001 and 2002, respectively, in addition to the interleaved wheel electrodes 116-1 through 116-4. The first and second auxiliary conductive structures 2001 and 2002 in the example of FIGS. 20 and 21 can be conductive traces on the top of a PCB structure 110 in one example. In this example, moreover, the auxiliary conductive structures 2001 and 2002 are laterally spaced from the capacitor plate structures 116 in the second region 117 on the first side 110T of the first structure 110. Similar examples can be implemented in non-rotational user interfaces, for example, by providing one or more auxiliary conductive structures laterally spaced to the left and/or to the right of the capacitor plate structures 1216 in FIG. 12 above.

The inner auxiliary conductive structure 2001 and the outer auxiliary conductive structure 2002 in FIG. 20 are electrically connected by connections 118 to GPIOs of the capacitor sensor interface circuitry and/or of the MCU (e.g., 136 and/or 132 in FIG. 1) for selective connection to high or low supply voltages, to a ground reference voltage, or to place the electrode in a high impedance (HiZ) state, and the electrical connections can include switching or multiplexing circuits (not shown). The interface circuit 130 (FIG. 1) is configured in one example to provide the position signal POSITION that represents the relative position of the second structure 120 to the first structure 110 along the first direction 140 according to signals from the capacitor plate structures 116 as described above. In addition, the interface circuit 130 provides a second position signal (not shown) that represents the presence and location of a user touch of the second structure 120 according to the signals from the capacitor plate structures 116 and signals from one or both of the auxiliary conductive structure 2001, 2002. In certain examples, one of the auxiliary conductive structures 2001 or 2002 can be omitted. The provision of one or more of the auxiliary conductive structures 2001 and/or 2002 as shown in FIGS. 20 and 21 facilitates detection of the presence of a user touch on the top surface 120T of the second structure 120, and further allows distinction of identified user touch events from capacitance measurements influenced by the position of the conductive structure 122 of the second user interface structure.

FIG. 22 shows a method 2200 for detecting relative positions of first and second user interface structures and four detecting user touching of the rotational second structure 120, which can be implemented in the example user interface 2000 of FIGS. 20 and 21. The method 2200 involves detecting the relative positions of the stationary first structure 110 and the movable second structure 120, where the first structure 110 includes a plurality of conductive capacitor plate structures 116 positioned on the first structure 110, and at least one auxiliary conductive structure 2001, 2002 laterally spaced from the capacitor plate structures 116 on the first structure 110 as shown in FIGS. 20 and 21. In this example, the second structure 120 includes a conductive structure 122 to move along the direction 140 to selectively modify a capacitance of a given capacitor formed by a given pair of the capacitor plate structures 116 when the conductive structure 122 is positioned proximate the given pair of the capacitor plate structures 116. The method 2200 can be implemented in conjunction with the above-described optical detection methods 900, 1900 in certain examples. FIG. 22 illustrates an example process that is repeated in each of a series of measurement cycles, in which the auxiliary electrode or electrodes 2001, 2002 is/are set to a high impedance (HiZ) state at 2202, the method 2200 further includes measuring a plurality of capacitances of a corresponding plurality of conductive capacitor plate structures 116 while the auxiliary conductive structure or structures 2001, 2002 is/are in the high impedance state. In one example, capacitances of the four pairs of conductive capacitor plate structures 116 are measured at 2204 with both the auxiliary conductive structures 2001, 2002 in the high impedance state to obtain for capacitance measurements. As previously noted, this measurement set can be further processed to identify the rotational position of the conductive structure 122 along the rotary direction 140 as discussed above based on the resulting set of capacitance values.

At 2206 in FIG. 22, the capacitor sense interface circuit (136 in FIG. 1 above) sets the auxiliary conductive structures to a predetermined voltage level (e.g., a low voltage, such as a ground reference in one example), and the pairwise capacitor measurements are performed at 2208 while the voltage of the auxiliary conductive structure 2001, 2002 is at the predetermined voltage level. At 2210, the measured capacitances are processed to identify the rotational position of the second structure 120 relative to the first structure 110 (e.g., to generate the POSITION signal described above), and to identify the presence and location of a user touch of the second structure 120. The example of FIGS. 20-22 supports capacitive sensing of a user's finger position as well as a mechanical rotation/position detection utilizing the capacitive sensing features. In addition, these concepts can be used in combination with the optical position sensing concepts discussed above. The rotating conductive structure 122 influences the electric field originated by the capacitive wheel structures 116, and this influence can be even enhanced by an extension of the electrode structure 122 over one or more of the auxiliary conductive structures 2001, 2002. Changing the electric potential of the one or more of the auxiliary conductive structures 2001, 2002 also influences an auxiliary electric field between the auxiliary electrode and the wheel electrode structure 116, and also impacts the capacitance on the wheel structures 116.

The change in the capacitance due to the position of the movable conductive structure 122 above the wheel structures 116, in combination with the auxiliary conductive structure voltage related change, can be used to enhance the detection of the position of the movable structure 122. The system can implement one or both of self-capacitance and/or mutual capacitance measurements at 2204 and 2208. Self-capacitance measurements use the change in the capacitance between the touch electrode and the counterpart electrode in form of the user's finger or hand.

One example measurement sequence (Case 1) using the auxiliary electrode either inside (2001) or outside (2002) the wheel structure (self-capacitance mode) includes 1. switching the auxiliary electrode connected to a GPIO to HiZ (2202 in FIG. 22), 2. performing capacitive measurements on the wheel electrodes including pair-wise switching of the measured electrode's connection to capacitive sensing, while the other wheel electrodes are in the high impedance state HiZ. This processing at 2204 in FIG. 22 is repeated for all the four wheel electrodes. This example sequence further includes switching the auxiliary electrode connected to GPIO to output LOW (e.g., emulating GND at 2206), 4. performing capacitive measurements (2208) as in phase 2, and 5. comparing the capacitance measurement results (2210) of Phase 2 and Phase 4. The comparison indicates either the position of the conductive structure 122 only (no user touch detected), or indicating a detected user touch event in which case the resulting values would be the same for Phase 2 and Phase 4 results. In this latter case of two positions, one corresponds to the position of the movable conductive structure 122, and the other corresponds to the position of the user's finger. These can be distinguished, since the one for the user's finger would show no difference in the responses between results for Phase 2 and Phase 4, where the finger is placed only above the wheel electrodes.

For mutual capacitance measurements in a second case (Case 2), the electrode base includes at least two electrodes for one touch element, where one is a transmit (TX) electrode, and the other is a receive (RX) electrode. The presence of a user touch event influences the capacitance between the TX and RX electrodes. In this case, as the movable conductive electrode 122 is floating relative to the circuit ground reference, and its impact on the capacitance of the wheel or other capacitive sensors on the PCB 110 can be relatively small. In combination with the mutual capacitance method, the influence of the structure 122 is significantly higher, as it acts like an inserted additional electrode in relation to the TX and RX electrodes 116. In the second example case, using an auxiliary electrode 2001 or 2002 either outside or inside the wheel electrodes 116 (mutual capacitance mode), the GPIO switches the auxiliary electrode to HiZ, and the system performs capacitive measurements on the wheel electrodes 116. This case further includes switching the measured electrode's connection to capacitive sensing, one electrode 116 configured as RX (receive) electrode, and a neighboring electrode 116 configured as TX (transmit) electrode, while all other wheel electrodes 116 are HiZ. This measurement is repeated for all wheel electrodes 116 for Phase 2 of this case. Thereafter, the auxiliary electrode 2001 and/or 2002 is/are connected to the reference voltage (e.g., low or GND in Phase 3) by the associated GPIO(s), and capacitance measurements are repeated as in Phase 2. In Phase 5 for this case, the behavior of the measurement results for Phase 2 and Phase 4 are compared, indicating either the position of the structure 122, where the resulting values of 122 would differ for Phase 2 and Phase 4 results. In case of two positions, one from 122 and one from finger the one for the finger would show no difference in the responses between results for Phase 2 and Phase 4, under the assumption the finger being placed only on the wheel electrodes.

In further measurement sequence examples using the two auxiliary electrodes 2001 and 2002 (inside and outside of the wheel structure electrodes 116), the phases are basically the same as in Case 1 and Case 2, but the system provides higher operational safety, as the finger can be placed only above one of the auxiliary electrodes 2001 or 2002, while the structure 122 is designed (e.g., as shown in FIGS. 20 and 21) to be always at least partially above both auxiliary electrodes 2001 and 2002. This configuration results in change of capacitive responses dependent upon both auxiliary electrode states (e.g., HiZ and Lo/GND) during the measurement phases 2 and 4. With the two auxiliary electrodes 2001 and 2002 both present, two additional phases (measurements) per wheel electrode are performed, as described for two further example cases Case 3 and Case 4.

For Case 3, using the illustrated first and second auxiliary electrodes 2001, 2002 respectively inside and outside of the wheel structures 116 (self-capacitance mode), the electrodes 2001 and 2002 are connected by two corresponding GPIOs to HiZ. In a second phase, capacitive measurements are performed on the wheel electrodes 116, switching the measured electrode's connection to capacitive sensing, while the other wheel electrodes are HiZ, and this is repeated for all wheel electrodes 116. In Phase 3, the auxiliary electrode 2001 is connected by its GPIO to output Lo (e.g., emulating GND), while the second auxiliary electrode 2002 is connected by its GPIO in HiZ mode. In phase 4, the capacitive measurements are performed as in Phase 2. In a fifth Phase 5, the first auxiliary electrode 2001 is connected by its GPIO back to HiZ, while the second auxiliary electrode 2002 is switched by its GPIO to output Lo to emulate grounding, and capacitive measurements are performed in this condition in a sixth Phase using similar processing as in Phase 2. The example Case 3 also include a seventh Phase 7 that switches both auxiliary electrodes 2001 and 2002 to output Lo, and an eighth Phase 8 that includes performing capacitive measurements as in Phase 2. In a ninth Phase 9, the system compares the behavior of the measurement results of Phase 2, 4, 6 and 8, indicating either the structure 122 position only, in this case the resulting values of 122 would differ for Phase 2-8 results. In case of two positions, one from 122 and one from a user's finger, the one for the finger would show no difference in at least two of the four measurement results in relation to the states of the auxiliary electrodes 2001, 2002, as the user's finger can be only placed above one of the auxiliary electrodes 2001 or 2002.

A fourth example capacitance measurement sequence (Case 4 for mutual capacitance mode) uses the two inner and outer auxiliary electrodes 2001 and 2002, and includes a first Phase 1 where the auxiliary electrodes 2001 and 2002 are connected by their corresponding GPIOs to HiZ. In a second Phase 2, the system performs capacitive measurements on the wheel electrodes 116, switching the measured electrode's connection to capacitive sensing (being configured by its GPIO as a receive (RX) electrode (e.g., the GPIO operates as an analog input), while one neighboring electrode 116 is configured as TX (transmit) electrode (e.g., the corresponding GPIO is configured as an analog output or digital output), and all other wheel electrodes are in the HiZ state. This measurement phase processing is repeated for all the wheel electrodes 116. In a third Phase 3, the system switches the first auxiliary electrode 2001 to output Lo (e.g., emulating GND) while the second auxiliary electrode 2002 is connected by its GPIO in HiZ mode. In a fourth Phase 4, the system performs capacitive measurements as in Phase 2. In a fifth phase of the Case 4 example, the system switches the first auxiliary electrode 2001 back to the HiZ condition, while switching the second auxiliary electrode 2002 to output Lo. In a sixth Phase 6, capacitive measurements are performed as in Phase 2. In a seventh Phase 7, the system switches both auxiliary electrodes 2001 and 2002 to output Lo, and capacitive measurements are performed in an eighth Phase 8 as in Phase 2. In a ninth phase 9, the system compares the behavior of the measurement results of Phase 2, 4, 6 and 8, indicating either the structure 122 position only, in which case the resulting values of 122 would differ for Phase 2-8 results. In the case of two positions (e.g., one from the structure 122 and one from the user's finger), the one for the user's finger would show no difference at least in two measurement results in relation to the states of the auxiliary electrodes 2001 and 2002, as the user's finger can only be placed above one of the auxiliary electrodes 2001 or 2002.

The following is claimed:
1. A control apparatus for a user interface, comprising:
a first structure, including:
  a first side, including a first region, and a second region,
  an integer number N optical sources positioned in the first region on the first side of the first structure to selectively direct light away from the first side, N being greater than 1,
  an integer number N optical sensors positioned in the first region on the first side of the first structure to selectively sense light directed toward the first side of the first structure, the individual optical sensors positioned proximate a corresponding one of the optical sources, the optical sources and optical sensors forming N optical device pairs spaced from one another along a first direction, and
  a plurality of conductive capacitor plate structures positioned in the second region on the first side of the first structure to form an integer number J capacitors;
a second structure movable relative to the first structure along the first direction, the second structure including:
  a second side, including a first movable region facing the first region of the first structure, and a second movable region facing the second region of the first structure,
  a reflector positioned in the first movable region on the second side of the second structure to move along the first direction to selectively reflect light from one of the optical sources to the corresponding optical sensor of a given optical device pair when the reflector is positioned proximate the given optical device pair, and a conductive structure positioned in the second movable region on the second side of the second structure to move along the first direction to selectively modify a capacitance of a given one of the capacitors formed by a given group of two or more of the capacitor plate structures when the conductive structure is positioned proximate the given group of the capacitor plate structures; and an interface circuit to provide a position signal representing the relative position of the second structure to the first structure along the first direction according to signals from the optical sensors and signals from the capacitor plate structures.

2. The control apparatus of claim 1,
wherein the first direction is circumferential relative to an axis;
wherein the optical device pairs are angularly spaced from one another by an optical device angle along the first direction;
wherein the reflector extends along the first direction by a reflector angle along the first direction; and
wherein the second structure is a cylindrical knob rotatable relative to the first structure about the axis to cause the reflector to move along the first direction to selectively reflect light from one of the optical sources to the corresponding optical sensor of the given optical device pair when the reflector is positioned proximate the given optical device pair.

3. The control apparatus of claim 2, wherein the reflector angle is greater than the optical device angle.

4. The control apparatus of claim 3, wherein the second structure further includes a non-reflective surface positioned in the first movable region on the second side of the second structure spaced from the reflector along the first direction to selectively mitigate reflection of light from at least one of the optical sources to the corresponding optical sensor of a second given optical device pair when the non-reflective surface is positioned proximate the second given optical device pair.

5. The control apparatus of claim 3, wherein the second structure includes a plurality of reflectors spaced from one another along the first direction in the first movable region on the second side of the second structure to individually move along the first direction to selectively reflect light from one of the optical sources to the corresponding optical sensor of a given optical device pair when the given reflector is positioned proximate the given optical device pair.

6. The control apparatus of claim 2, wherein the second structure includes a transparent aperture positioned in the first movable region to allow light from the optical sources to pass through the second structure.

7. The control apparatus of claim 2, wherein the optical sources are LEDs having a first wavelength; wherein the optical sensors are LEDs having a second wavelength; and wherein the first wavelength is less than or equal to the second wavelength.

8. The control apparatus of claim 2, wherein the first region and the second region of the first side of the first structure are radially spaced from one another relative to the axis, and wherein the second region is radially positioned between the axis and the first region.

9. The control apparatus of claim 1, wherein the interface circuit includes:

a first interface circuit coupled to selectively provide optical excitation signals to selectively illuminate the optical sources, and to selectively receive optical sense signals from the optical sensors in response to illumination of the optical sources; and a second interface circuit coupled to selectively provide capacitor excitation signals to at least some of the conductive capacitor plate structures, and to selectively receive capacitor sense signals from at least some of the conductive capacitor plate structures in response to provision of the capacitor excitation signals.

10. The control apparatus of claim 9, wherein the first interface circuit includes a multiplexer to selectively connect a shared general purpose input/output (GPIO) line or a shared analog to digital converter (ADC) line to a selected terminal of a selected one of the optical sources or to a selected terminal of a selected one of the optical sensors.

11. The control apparatus of claim 1,
wherein the first direction is linear;
wherein the optical device pairs are spaced from one another by an optical device spacing distance along the first direction;
wherein the reflector extends along the first direction by a reflector distance along the first direction; and
wherein the second structure is movable relative to the first structure along the first direction to cause the reflector to move along the first direction to selectively reflect light from one of the optical sources to the corresponding optical sensor of the given optical device pair when the reflector is positioned proximate the given optical device pair.

12. The control apparatus of claim 11, wherein the reflector distance is greater than the optical device spacing distance.

13. The control apparatus of claim 12, wherein the second structure further includes a non-reflective surface positioned in the first movable region on the second side of the second structure spaced from the reflector along the first direction to selectively mitigate reflection of light from at least one of the optical sources to the corresponding optical sensor of a second given optical device pair when the non-reflective surface is positioned proximate the second given optical device pair.

14. The control apparatus of claim 12, wherein the second structure includes a plurality of reflectors spaced from one another along the first direction in the first movable region on the second side of the second structure to individually move along the first direction to selectively reflect light from one of the optical sources to the corresponding optical sensor of a given optical device pair when the given reflector is positioned proximate the given optical device pair.

15. The control apparatus of claim 11, wherein the second structure includes a transparent aperture positioned in the first movable region to allow light from the optical sources to pass through the second structure.

16. The control apparatus of claim 1, wherein the optical sources are LEDs having a first wavelength; wherein the optical sensors are LEDs having a second wavelength; and wherein the first wavelength is less than or equal to the second wavelength.

17. The control apparatus of claim 1, further comprising at least one auxiliary conductive structure laterally spaced from the capacitor plate structures in the second region on the first side of the first structure; wherein the interface circuit is configured to provide the position signal representing the relative position of the second structure to the first structure along the first direction, and to provide a second position signal representing the presence and location of a user touch of the second structure according to signals from the capacitor plate structures and a signal from the at least one auxiliary conductive structure.

18. A position detection system for detecting relative positions of a stationary first user interface structure and a movable second user interface structure, the system comprising:
   an optical position sensing system, including:
      a plurality of optical device pairs individually including an optical source and an optical sensor, the optical device pairs spaced from one another along a first direction on a first side of the first user interface structure,
      a reflector extending by a reflector distance along the first direction on a second side of the second user interface structure that faces the first side of the first user interface structure to selectively reflect light from one of the optical sources to the corresponding optical sensor of a given optical device pair when the reflector is positioned proximate the given optical device pair, and
      a non-reflective surface spaced from the reflector along the first direction on the second side of the second user interface structure to selectively mitigate reflection of light from at least one of the optical sources to the corresponding optical sensor of a second given optical device pair when the non-reflective surface is positioned proximate the second given optical device pair;
   a capacitive position sensing system, including:
      a plurality of conductive capacitor plate structures positioned on the first side of the first user interface structure to form an integer number J capacitors, and
      a conductive structure on the second side of the second user interface structure to move along the first direction to selectively modify a capacitance of a given one of the capacitors formed by a given group of two or more of the capacitor plate structures when the conductive structure is positioned proximate the given group of the capacitor plate structures; and
   an interface circuit to provide a position signal representing the relative position of the second structure to the first structure along the first direction according to signals from the optical sensors and signals from the capacitor plate structures.

19. The system of claim 18, wherein the optical sources are LEDs having a first wavelength; wherein the optical sensors are LEDs having a second wavelength; and wherein the first wavelength is less than or equal to the second wavelength.

20. The system of claim 18, wherein the second structure includes a transparent aperture positioned configured to allow light from the optical sources to pass through the second structure.

21. A method for detecting relative positions of a stationary first user interface structure and a movable second user interface structure, the method comprising:
   in a first mode, illuminating a plurality of optical sources positioned along a first direction on a first side of the first user interface structure;
   in the first mode, receiving sensor signals from a plurality of optical sensors positioned along the first direction on the first side of the first user interface structure to receive reflected light from a respective source of the plurality of optical sources;
   in the first mode, detecting the relative positions of the stationary first user interface structure and the second user interface structure based on the sensor signals from the optical sensors; and
   in a second mode, illuminating one or more of the optical sources in a pattern that indicates the detected relative positions of the stationary first user interface structure and the second user interface structure.

22. A method for detecting relative positions of a stationary first structure and a movable second structure, the first structure having a plurality of conductive capacitor plate structures positioned on the first structure, and an auxiliary conductive structure laterally spaced from the plurality of capacitor plate structures on the first structure, the second structure having a conductive structure to move along a first direction to selectively modify a capacitance of a given capacitor formed by a given pair of the plurality of capacitor plate structures when the conductive structure is positioned proximate the given pair of the plurality of capacitor plate structures, the method comprising:
   setting the auxiliary conductive structure to a high impedance state;
   measuring a plurality of capacitances of the plurality of conductive capacitor plate structures while the auxiliary conductive structure is in the high impedance state;
   setting a voltage of the auxiliary conductive structure to a predetermined voltage level;
   measuring the plurality of capacitances of the plurality of conductive capacitor plate structures while the voltage of the auxiliary conductive structure is at the predetermined voltage level; and
   processing the measured capacitances to identify a rotational position of the second structure relative to the first structure, and to identify a presence and a location of a user touch of the second structure.

* * * * *